(12) United States Patent
Kim et al.

(10) Patent No.: US 10,776,227 B2
(45) Date of Patent: Sep. 15, 2020

(54) MEMORY MANAGEMENT SYSTEM AND METHOD THEREOF

(71) Applicant: Korea University Research and Business Foundation, Seoul (KR)

(72) Inventors: Seon Wook Kim, Gyeonggi-do (KR); Ho Kwon Kim, Gyeonggi-do (KR); Jae Yung Jun, Seoul (KR); Kyu Hyun Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 235 days.

(21) Appl. No.: 15/641,670

(22) Filed: Jul. 5, 2017

(65) Prior Publication Data

US 2018/0011770 A1 Jan. 11, 2018

(30) Foreign Application Priority Data

Jul. 7, 2016 (KR) .................. 10-2016-0086017

(51) Int. Cl.
*G06F 11/00* (2006.01)
*G06F 11/20* (2006.01)

(52) U.S. Cl.
CPC .......... *G06F 11/2094* (2013.01); *G06F 11/20* (2013.01); *G06F 2201/82* (2013.01)

(58) Field of Classification Search
CPC ........................ G06F 11/2094; G06F 11/20
See application file for complete search history.

(56) References Cited

U.S. PATENT DOCUMENTS

| | | | | |
|---|---|---|---|---|
| 6,247,153 B1* | 6/2001 | Jeon | ................ | G11C 29/56 714/718 |
| 7,724,573 B2* | 5/2010 | Tokiwa | ................ | G11C 16/06 365/185.09 |
| 9,633,066 B1* | 4/2017 | Rajaa | ................ | G06F 16/2365 |
| 2011/0191538 A1* | 8/2011 | Maeda | ................ | G06F 12/16 711/114 |

* cited by examiner

*Primary Examiner* — Katherine Lin
(74) *Attorney, Agent, or Firm* — Fox Rothschild LLP

(57) ABSTRACT

Disclosed are a memory management system and a method thereof. Restricted spare cells are optimally distributed (or allocated) into a physical region and a virtual region in a system for repairing a fault of a memory, thereby increasing a yield of a memory chip.

28 Claims, 47 Drawing Sheets

|  | UNIT REGION | | | |
|---|---|---|---|---|
|  | 0 | 1 | 2 | 3 |
| 0 |  | X | X | X |
| 1 |  |  |  |  |
| 2 |  |  |  |  |
| 3 |  |  |  |  |

UNIT REGION (rows)

X : FAULT

FIG. 3

| Subarray | Subregions | # of Faults | # of spare row |
|---|---|---|---|
| 0 | 0 | 4 | 4 |
| | 1 | 0 | |
| | 2 | 4 | |
| | 3 | 3 | |
| 1 | 0 | 2 | 4 |
| | 1 | 5 | |
| | 2 | 1 | |
| | 3 | 3 | |
| 2 | 0 | 6 | 4 |
| | 1 | 1 | |
| | 2 | 5 | |
| | 3 | 2 | |
| 3 | 0 | 3 | 3 |
| | 1 | 2 | |
| | 2 | 5 | |
| | 3 | 0 | |

| Virtual Subarray# | # of spare col |
|---|---|
| 0 | 8 |
| 1 | 7 |
| 2 | 8 |
| 3 | 8 |

FIG. 11

|       | $V_0$ | $V_1$ | $V_2$ | $V_3$ |   |
|-------|-------|-------|-------|-------|---|
| $P_0$ | 4     | 0     | 4     | 3     | 4 |
| $P_1$ | 2     | 5     | 1     | 3     | 4 |
| $P_2$ | 6     | 1     | 5     | 2     | 4 |
| $P_3$ | 3     | 2     | 5     | 0     | 3 |
|       | 8     | 7     | 8     | 8     |   |
|       | 15    | 8     | 15    | 8     |   |

FIG. 12

|     | V₀ | V₁ | V₂ | V₃ |    |
|-----|----|----|----|----|----|
| P₀  | 3  | 0  | 4  | 3  | 3  |
| P₁  | 2  | 5  | 1  | 3  | 4  |
| P₂  | 6  | 1  | 5  | 2  | 4  |
| P₃  | 3  | 2  | 5  | 0  | 3  |
|     | 8  | 7  | 8  | 8  |    |
|     | 14 | 8  | 15 | 8  |    |

A0>C0, V0, R0, A0 SELECT

FIG. 13

|     | V₀ | V₁ | V₂ | V₃ |    |
|-----|----|----|----|----|----|
| P₀  | 3  | 0  | 4  | 3  | 3  |
| P₁  | 2  | 5  | 0  | 3  | 3  |
| P₂  | 6  | 1  | 5  | 2  | 4  |
| P₃  | 3  | 2  | 5  | 0  | 3  |
|     | 8  | 7  | 8  | 8  |    |
|     | 14 | 8  | 14 | 8  |    |

A2>C2, V2, R1, A2 SELECT

FIG. 14

|    | V₀ | V₁ | V₂ | V₃ |    |
|----|----|----|----|----|----|
| P₀ | 3  | 0  | 4  | 3  | 3  |
| P₁ | 2  | 5  | 0  | 3  | 3  |
| P₂ | 5  | 1  | 5  | 2  | 3  |
| P₃ | 3  | 2  | 5  | 0  | 3  |
|    | 8  | 7  | 8  | 8  |    |
|    | 13 | 8  | 14 | 8  |    |

A0>C0, V0, R2, A0 SELECT

FIG. 15

|    | V₀ | V₁ | V₂ | V₃ |   |
|----|----|----|----|----|---|
| P₀ | 3  | 0  | 3  | 3  | 2 |
| P₁ | 2  | 5  | 0  | 3  | 3 |
| P₂ | 5  | 1  | 5  | 2  | 3 |
| P₃ | 3  | 2  | 5  | 0  | 3 |
|    | 8  | 7  | 8  | 8  |   |
|    | 13 | 8  | 13 | 8  |   |

A2>C2, V2, R0, A2 SELECT

FIG. 16

|    | $V_0$ | $V_1$ | $V_2$ | $V_3$ |    |
|----|-------|-------|-------|-------|----|
| $P_0$ | 3 | 0 | 3 | 3 | 2 |
| $P_1$ | 1 | 5 | 0 | 3 | 2 |
| $P_2$ | 5 | 1 | 5 | 2 | 3 |
| $P_3$ | 3 | 2 | 5 | 0 | 3 |
|    | 8 | 7 | 8 | 8 |    |
|    | 12 | 8 | 13 | 8 |    |

A0>C0, V0, R1, A0 SELECT

FIG. 17

|    | $V_0$ | $V_1$ | $V_2$ | $V_3$ |    |
|----|----|----|----|----|----|
| $P_0$ | 3 | 0 | 3 | 3 | 2 |
| $P_1$ | 1 | 5 | 0 | 3 | 2 |
| $P_2$ | 5 | 1 | 4 | 2 | 2 |
| $P_3$ | 3 | 2 | 5 | 0 | 3 |
|    | 8 | 7 | 8 | 8 |    |
|    | 12 | 8 | 12 | 8 |    |

A2>C2, V2, R2, A2 SELECT

FIG. 18

|     | V₀ | V₁ | V₂ | V₃ |   |
|-----|----|----|----|----|---|
| P₀  | 3  | 0  | 3  | 3  | 2 |
| P₁  | 1  | 5  | 0  | 3  | 2 |
| P₂  | 5  | 1  | 4  | 2  | 2 |
| P₃  | 2  | 2  | 5  | 0  | 2 |
|     | 8  | 7  | 8  | 8  |   |
|     | 11 | 8  | 12 | 8  |   |

A0>C0, V0, R3, A0 SELECT

FIG. 19

|     | V₀ | V₁ | V₂ | V₃ |    |
|-----|----|----|----|----|----|
| P₀  | 3  | 0  | 2  | 3  | 1  |
| P₁  | 1  | 5  | 0  | 3  | 2  |
| P₂  | 5  | 1  | 4  | 2  | 2  |
| P₃  | 2  | 2  | 5  | 0  | 2  |
|     | 8  | 7  | 8  | 8  |    |
|     | 11 | 8  | 11 | 8  |    |

A2>C2, V2, R0, A2 SELECT

FIG. 20

|    | V₀ | V₁ | V₂ | V₃ |   |
|----|----|----|----|----|---|
| P₀ | 3  | 0  | 2  | 3  | 1 |
| P₁ | 0  | 5  | 0  | 3  | 1 |
| P₂ | 5  | 1  | 4  | 2  | 2 |
| P₃ | 2  | 2  | 5  | 0  | 2 |
|    | 8  | 7  | 8  | 8  |   |
|    | 10 | 8  | 11 | 8  |   |

A0>C0, V0, R1, A0 SELECT

FIG. 21

|     | V₀ | V₁ | V₂ | V₃ |   |
|-----|----|----|----|----|---|
| P₀  | 3  | 0  | 2  | 3  | 1 |
| P₁  | 0  | 5  | 0  | 3  | 1 |
| P₂  | 5  | 1  | 3  | 2  | 1 |
| P₃  | 2  | 2  | 5  | 0  | 2 |
|     | 8  | 7  | 8  | 8  |   |
|     | 10 | 8  | 10 | 8  |   |

A2>C2, V2, R2, A2 SELECT

FIG. 22

|     | $V_0$ | $V_1$ | $V_2$ | $V_3$ |   |
|-----|-------|-------|-------|-------|---|
| $P_0$ | 3 | 0 | 2 | 3 | 1 |
| $P_1$ | 0 | 5 | 0 | 3 | 1 |
| $P_2$ | 5 | 1 | 3 | 2 | 1 |
| $P_3$ | 1 | 2 | 5 | 0 | 1 |
|     | 8 | 7 | 8 | 8 |   |
|     | 9 | 8 | 10 | 8 |   |

A0>C0, V0, R2, A0 SELECT

FIG. 23

|     | $V_0$ | $V_1$ | $V_2$ | $V_3$ |     |
| --- | --- | --- | --- | --- | --- |
| $P_0$ | 3 | 0 | 1 | 3 | 0 |
| $P_1$ | 0 | 5 | 0 | 3 | 1 |
| $P_2$ | 5 | 1 | 3 | 2 | 1 |
| $P_3$ | 1 | 2 | 5 | 0 | 1 |
|     | 8 | 7 | 8 | 8 |     |
|     | 9 | 8 | 9 | 8 |     |

A2>C2, V2, R0, A2 SELECT

FIG. 24

|    | $V_0$ | $V_1$ | $V_2$ | $V_3$ |   |
|----|----|----|----|----|---|
| $P_0$ | 3 | 0 | 1 | 3 | 0 |
| $P_1$ | 0 | 5 | 0 | 3 | 1 |
| $P_2$ | 4 | 1 | 3 | 2 | 0 |
| $P_3$ | 1 | 2 | 5 | 0 | 1 |
|    | 8 | 7 | 8 | 8 |   |
|    | 8 | 8 | 9 | 8 |   |

A0>C0, V0, R2, A0 SELECT

FIG. 25

|     | $V_0$ | $V_1$ | $V_2$ | $V_3$ |   |
|-----|-----|-----|-----|-----|---|
| $P_0$ | 3 | 0 | 1 | 3 | 0 |
| $P_1$ | 0 | 4 | 0 | 3 | 0 |
| $P_2$ | 4 | 1 | 3 | 2 | 0 |
| $P_3$ | 1 | 2 | 5 | 0 | 1 |
|     | 8 | 7 | 8 | 8 |   |
|     | 8 | 7 | 9 | 8 |   |

A1>C1, V1, R1, A1 SELECT

FIG. 26

|       | V₀ | V₁ | V₂ | V₃ |   |
|-------|----|----|----|----|---|
| P₀    | 3  | 0  | 1  | 3  | 0 |
| P₁    | 0  | 4  | 0  | 3  | 0 |
| P₂    | 4  | 1  | 3  | 2  | 0 |
| P₃    | 1  | 2  | 4  | 0  | 0 |
|       | 8  | 7  | 8  | 8  |   |
|       | 8  | 7  | 8  | 8  |   |

A2>C2, V2, R3, A2 SELECT

FIG. 27

| ORDER | AY – CY | VALUE |
|---|---|---|
| 1 | A0 – C0 | 7 |
| 2 | A2 – C2 | 7 |
| 3 | A1 – C1 | 1 |
| 4 | A3 – C3 | 0 |

FIG. 30

|    | V₀ | V₁ | V₂ | V₃ |    |
|----|----|----|----|----|----|
| P₀ | 4  | 0  | 4  | 3  | 4  |
| P₁ | 2  | 5  | 1  | 3  | 4  |
| P₂ | 6  | 1  | 5  | 2  | 4  |
| P₃ | 3  | 2  | 5  | 0  | 3  |
|    | 8  | 7  | 8  | 8  |    |
|    | 15 | 8  | 15 | 8  |    |

FIG. 31

|    | V₀ | V₁ | V₂ | V₃ |   |
|----|----|----|----|----|----|
| P₀ | 3  | 0  | 4  | 3  | 3 |
| P₁ | 2  | 5  | 1  | 3  | 4 |
| P₂ | 6  | 1  | 5  | 2  | 4 |
| P₃ | 3  | 2  | 5  | 0  | 3 |
|    | 8  | 7  | 8  | 8  |   |
|    | 14 | 8  | 15 | 8  |   |

A0>C0, V0, R0, A0 SELECT

FIG. 32

|     | V₀ | V₁ | V₂ | V₃ |    |
|-----|----|----|----|----|----|
| P₀  | 2  | 0  | 4  | 3  | 2  |
| P₁  | 2  | 5  | 1  | 3  | 4  |
| P₂  | 6  | 1  | 5  | 2  | 4  |
| P₃  | 3  | 2  | 5  | 0  | 3  |
|     | 8  | 7  | 8  | 8  |    |
|     | 13 | 8  | 15 | 8  |    |

A0>C0, V0, R0, A0 SELECT

FIG. 33

|     | $V_0$ | $V_1$ | $V_2$ | $V_3$ |     |
| --- | --- | --- | --- | --- | --- |
| $P_0$ | 1 | 0 | 4 | 3 | 1 |
| $P_1$ | 2 | 5 | 1 | 3 | 4 |
| $P_2$ | 6 | 1 | 5 | 2 | 4 |
| $P_3$ | 3 | 2 | 5 | 0 | 3 |
|     | 8 | 7 | 8 | 8 |     |
|     | 12 | 8 | 15 | 8 |     |

A0>C0, V0, R0, A0 SELECT

FIG. 34

|  | $V_0$ | $V_1$ | $V_2$ | $V_3$ |  |
|---|---|---|---|---|---|
| $P_0$ | 0 | 0 | 4 | 3 | 0 |
| $P_1$ | 2 | 5 | 1 | 3 | 4 |
| $P_2$ | 6 | 1 | 5 | 2 | 4 |
| $P_3$ | 3 | 2 | 5 | 0 | 3 |
|  | 8 | 7 | 8 | 8 |  |
|  | 11 | 8 | 15 | 8 |  |

A0>C0, V0, R0, A0 SELECT

FIG. 35

|     | $V_0$ | $V_1$ | $V_2$ | $V_3$ |    |
|-----|-------|-------|-------|-------|----|
| $P_0$ | 0 | 0 | 4 | 3 | 0 |
| $P_1$ | 1 | 5 | 1 | 3 | 3 |
| $P_2$ | 6 | 1 | 5 | 2 | 4 |
| $P_3$ | 3 | 2 | 5 | 0 | 3 |
|     | 8 | 7 | 8 | 8 |    |
|     | 10 | 8 | 15 | 8 |    |

A0>C0, V0, R1, A0 SELECT

FIG. 36

|     | V₀ | V₁ | V₂ | V₃ |     |
|-----|----|----|----|----|-----|
| P₀  | 0  | 0  | 4  | 3  | 0   |
| P₁  | 0  | 5  | 1  | 3  | 2   |
| P₂  | 6  | 1  | 5  | 2  | 4   |
| P₃  | 3  | 2  | 5  | 0  | 3   |
|     | 8  | 7  | 8  | 8  |     |
|     | 9  | 8  | 15 | 8  |     |

A0>C0, V0, R1, A0 SELECT

FIG. 37

|     | V₀ | V₁ | V₂ | V₃ |     |
|-----|----|----|----|----|-----|
| P₀  | 0  | 0  | 4  | 3  | 0   |
| P₁  | 0  | 5  | 1  | 3  | 2   |
| P₂  | 5  | 1  | 5  | 2  | 3   |
| P₃  | 3  | 2  | 5  | 0  | 3   |
|     | 8  | 7  | 8  | 8  |     |
|     | 8  | 8  | 15 | 8  |     |

A0>C0, V0, R2, A0 SELECT

FIG. 38

|     | V₀ | V₁ | V₂ | V₃ |   |
|-----|----|----|----|----|---|
| P₀  | 0  | 0  | 4  | 3  | 0 |
| P₁  | 0  | 5  | 0  | 3  | 1 |
| P₂  | 5  | 1  | 5  | 2  | 3 |
| P₃  | 3  | 2  | 5  | 0  | 3 |
|     | 8  | 7  | 8  | 8  |   |
|     | 8  | 8  | 14 | 8  |   |

A2>C2, V2, R1, A2 SELECT

FIG. 39

|     | V₀ | V₁ | V₂ | V₃ |   |
|-----|----|----|----|----|---|
| P₀  | 0  | 0  | 4  | 3  | 0 |
| P₁  | 0  | 5  | 0  | 3  | 1 |
| P₂  | 5  | 1  | 4  | 2  | 2 |
| P₃  | 3  | 2  | 5  | 0  | 3 |
|     | 8  | 7  | 8  | 8  |   |
|     | 8  | 8  | 13 | 8  |   |

A2>C2, V2, R2, A2 SELECT

FIG. 40

|     | V₀ | V₁ | V₂ | V₃ |   |
|-----|----|----|----|----|----|
| P₀  | 0  | 0  | 4  | 3  | 0 |
| P₁  | 0  | 5  | 0  | 3  | 1 |
| P₂  | 5  | 1  | 3  | 2  | 1 |
| P₃  | 3  | 2  | 5  | 0  | 3 |
|     | 8  | 7  | 8  | 8  |   |
|     | 8  | 8  | 12 | 8  |   |

A2>C2, V2, R2, A2 SELECT

FIG. 41

|    | V₀ | V₁ | V₂ | V₃ |   |
|----|----|----|----|----|---|
| P₀ | 0  | 0  | 4  | 3  | 0 |
| P₁ | 0  | 5  | 0  | 3  | 1 |
| P₂ | 5  | 1  | 2  | 2  | 0 |
| P₃ | 3  | 2  | 5  | 0  | 3 |
|    | 8  | 7  | 8  | 8  |   |
|    | 8  | 8  | 11 | 8  |   |

A2>C2, V2, R2, A2 SELECT

FIG. 42

|    | V₀ | V₁ | V₂ | V₃ |   |
|----|----|----|----|----|---|
| P₀ | 0  | 0  | 4  | 3  | 0 |
| P₁ | 0  | 5  | 0  | 3  | 1 |
| P₂ | 5  | 1  | 2  | 2  | 0 |
| P₃ | 3  | 2  | 4  | 0  | 2 |
|    | 8  | 7  | 8  | 8  |   |
|    | 8  | 8  | 10 | 8  |   |

A2>C2, V2, R3, A2 SELECT

FIG. 43

|    | V₀ | V₁ | V₂ | V₃ |   |
|----|----|----|----|----|---|
| P₀ | 0  | 0  | 4  | 3  | 0 |
| P₁ | 0  | 5  | 0  | 3  | 1 |
| P₂ | 5  | 1  | 2  | 2  | 0 |
| P₃ | 3  | 2  | 3  | 0  | 1 |
|    | 8  | 7  | 8  | 8  |   |
|    | 8  | 8  | 9  | 8  |   |

A2>C2, V2, R3, A2 SELECT

FIG. 44

|       | $V_0$ | $V_1$ | $V_2$ | $V_3$ |   |
|-------|-------|-------|-------|-------|---|
| $P_0$ | 0     | 0     | 4     | 3     | 0 |
| $P_1$ | 0     | 5     | 0     | 3     | 1 |
| $P_2$ | 5     | 1     | 2     | 2     | 0 |
| $P_3$ | 3     | 2     | 2     | 0     | 0 |
|       | 8     | 7     | 8     | 8     |   |
|       | 8     | 8     | 8     | 8     |   |

A2>C2, V2, R3, A2 SELECT

FIG. 45

|  | $V_0$ | $V_1$ | $V_2$ | $V_3$ |  |
|---|---|---|---|---|---|
| $P_0$ | 0 | 0 | 4 | 3 | 0 |
| $P_1$ | 0 | 4 | 0 | 3 | 0 |
| $P_2$ | 5 | 1 | 2 | 2 | 0 |
| $P_3$ | 3 | 2 | 2 | 0 | 0 |
|  | 8 | 7 | 8 | 8 |  |
|  | 8 | 7 | 8 | 8 |  |

A1>C1, V1, R1, A1 SELECT

FIG. 46

MEMORY MANAGEMENT SYSTEM AND METHOD THEREOF

CROSS-REFERENCE TO RELATED APPLICATION

This application claims the benefit of Korean Application No. 10-2016-0086017 filed on Jul. 7, 2016 with the Korean Intellectual Property Office, the disclosure of which is incorporated herein by reference.

BACKGROUND

1. Field

The present solution relates to a memory management system and a method thereof, and more particularly, to a memory management system and a method thereof which optimally distributes (or allocates) restricted spare cells into physical regions and virtual regions in a system for repairing a fault of a memory and stores, at a distribution time, position information of K bits, position information of M+N−K bits, and a fault address in a fault address storage space which is managed by physical regions and virtual regions in a corresponding storage medium according to an allocating result of the spare cells.

2. Description of the Related Art

In a memory system configured by a plurality of subarrays, fault repair may be performed using one or more of spare rows, spare columns, and the like in the unit of sub arrays.

In this system, when a lot of faults are generated in the specific sub array, a storage space in which information on a fault position is to be stored is insufficient so that the fault cannot be repaired with a conventional structure which stores spare cell mapping information.

Further, when one memory chip is configured by a plurality of sub arrays having a smaller size, the repair is performed on a chip, in which the fault is generated, in the unit of sub arrays.

When a lot of faults are generated in some sub arrays and less faults are generated in the other sub arrays, if the faults are cured by using spare cells, a repair probability of a chip is lowered due to sub arrays in which a lot of faults are generated. In contrast, a storage space for fault information may remain in sub arrays in which less faults are generated.

SUMMARY

An object of the present solution is to provide a memory management system and a method thereof which optimally distribute (or allocate) restricted spare cells into one or more of physical regions and virtual regions in a system for repairing one or more of faults of a memory.

Another object of the present solution is to provide a memory management system in which sub arrays are physical regions which are unit regions and a control method thereof which optimally distribute virtual regions obtained by recombining physical regions into separate spare cells to maximize fault repair.

Still another object of the present solution is to provide a memory management system and a method thereof which provide allocation of spare cells which satisfy simultaneously not only a designed target value of virtual regions but also a designed target value of physical regions and store, at the time of allocation, position information of K bits, position information of M+N−K bits, and a fault address in a fault address storage space which is managed by physical regions and virtual regions in a corresponding storage medium according to an allocating result of the spare cell.

Still another object of the present solution is to provide a memory management system and a method thereof which repeatedly perform a repair on a virtual region selected by a fast column-first algorithm and a fast row-first algorithm using a column or a row and then perform a repair on a next virtual region.

According to an aspect of the present solution, there is provided a memory management method which repairs faults in a physical region and a virtual region using different spare cells, by means of an analyzing device. The method includes: repairing a fault by replacing a fault address with an address of a spare row in the physical region, by means of the analyzing device; and repairing a fault by replacing a fault address with an address of a spare column in the virtual region, by means of the analyzing device.

According to another aspect of the present solution, there is provided a memory management method including preferentially repairing a fault in a virtual region, by means of an analyzing device.

In some scenarios, the preferentially repairing a fault in the virtual region includes: generating a fault information management table related with a physical region and a virtual region, by means of the analyzing device; selecting a virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value, by means of the analyzing device; checking whether $A_Q$, which is the number of columns having unrepaired faults in the selected virtual region $V_Q$, is equal to or smaller than the $C_Q$, which is the number of available spare columns in the selected virtual region $V_Q$, by means of the analyzing device; and determining that the repair is unable only by the spare column when the $A_Q$ is larger than the $C_Q$ in the selected virtual region $V_Q$, as the checking result, and in order to perform the repair using the spare row, determining whether there is $R_X$ which is larger than 0 in the virtual region $V_Q$, by means of the analyzing device, $R_X$ being the number of spare rows available in each of the physical regions and being set in advance for all of the physical regions $P_X$, wherein Q is a value of a virtual region where a difference between the number of columns having fault and the number of spare columns has a maximum value.

In those or other scenarios, the fault information management table represents a relationship of $(f_{X,Y})$, $R_X$, $C_Y$ and $A_Y$ for the physical region $P_X$ and the virtual region $V_Y$, $(f_{X,Y})$ being the number of the unrepaired faults stored in the cell defined by the physical region $P_X$ and the virtual region $V_Y$, $R_X$ being the number of spare columns in each of the virtual regions and $A_Y$ being the number of columns having unrepaired faults in each of the virtual regions, and X denotes a physical region and Y denotes a virtual region.

In those or other scenarios, the method may further include: when $A_Q$, which is the number of columns having unrepaired faults in the selected virtual region $V_Q$, is equal to or smaller than $C_Q$, which is the number of available spare columns in the selected virtual region $V_Q$, as the checking result, determining that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in the storage medium corresponding to the virtual region, and ending the entire processes, by means of the analyzing device, wherein a value of the position information of K bits and a value of the position information of M+N−K bits are configured as vectors and positions of the bits are configured by "0" corresponding to a key value of the virtual basic region and "1" corresponding to a key value of the virtual sub region, and M, N, and K are natural numbers and K is equal to or smaller than M+N.

In those or other scenarios, the method may further include: when there is no $R_X$, which is the number of spare rows available in each of the physical regions which is larger than 0 which is set in advance, for all of the physical regions $P_X$, as the determining result, determining that the fault repair fails and ending the entire processes, by means of the analyzing device.

In those or other scenarios, the method may further include: when there is no available spare row and a value of $A_Y$ of the virtual region $V_Q$ is larger than a value of $C_Y$ of the virtual region $V_Q$, determining that the fault repair fails and ending the entire processes, by means of the analyzing device, $A_Y$ being the number of columns having unrepaired fault in each of the virtual regions, $C_Y$ being the number of spare columns available in each of the virtual regions and $V_Q$ being the virtual region in which the difference between $A_Y$ and $C_Y$ having the maximum value.

In those or other scenarios, the method may further include: when there is $R_X$, which is the number of spare rows available in each of the physical regions and set in advance, which is larger than 0, for all of the physical regions $P_X$ of the virtual region $V_Q$, as the determining result, selecting one physical region $P_A$ in which ($P_X$, $V_Q$) has a fault and $R_X$, which is the number of spare rows available in the physical region, has maximum value, by means of the analyzing device, $P_A$ being one of the physical regions $P_X$ and ($P_A$, $V_Q$) representing cells, which are defined by $P_X$ and $V_Q$, of the fault information management table; checking a row in which $A_Q$, which is the number of columns having unrepaired faults in the selected virtual region $V_Q$, is reduced at the most in ($P_A$, $V_Q$) corresponding to the selected physical region $P_A$, by means of the analyzing device, ($P_A$, $V_Q$) representing a cell, which is defined by $P_A$ and $V_Q$, of the fault information management table; reducing a value of ($f_{A,Q}$) of ($P_A$, $V_Q$) corresponding to the selected physical region $P_A$ as many as the number of faults which are repaired by the spare row, by means of the analyzing device, ($P_A$, $V_Q$) representing a cell, which is defined by $P_A$ and $V_Q$, of the fault information management table and ($f_{A,Q}$) being the number of the unrepaired faults stored in the cell defined by $P_A$ and $V_Q$; reducing $A_Q$, which is the number of columns corresponding to the selected physical region $P_A$ which are not repaired and have faults, as many as the number of columns which are repaired by the spare row so that the fault repair is not necessary, by means of the analyzing device; reducing $R_A$, which is the number of available spare rows, as many as the number of used spare rows, by means of the analyzing device; and returning to a process of selecting the virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of available spare columns in the selected virtual region $V_Q$, by means of the analyzing device.

In those or other scenarios, the preferentially repairing a fault in the virtual region includes: generating the fault information management table related with the physical region and the virtual region, by means of the analyzing device; calculating a difference value $A_Y$−$C_Y$, which is difference between $A_Y$, which is the number of columns having unrepaired fault in each of the virtual regions included in the fault information management table, and $C_Y$, which is the number of spare columns available in each of the virtual regions included in the fault information management table, by means of the analyzing device; sorting the calculated difference value $A_Y$−$C_Y$ and the virtual regions $V_Y$ corresponding to the difference value $A_Y$−$C_Y$ based on the calculated difference value $A_Y$−$C_Y$, by means of the analyzing device; selecting a virtual region $V_D$ in which the fault is not repaired, in the sorted order, by means of the analyzing device;

primarily checking whether $A_D$, which is the number of columns having unrepaired fault in the selected virtual region $V_D$, is equal to or smaller than $C_D$, which is the number of spare columns available in the virtual region $V_D$, by means of the analyzing device; and when the $A_D$ is larger than the $C_D$, as the primarily checking result, determining that the repair is unable only by the spare column and in order to perform the repair using the spare row, determining whether there is $R_X$ which is larger than 0 in the virtual region $V_D$, for all physical regions $P_X$, by means of the analyzing device, $R_X$ being the number of spare rows available in each of the physical regions and being set in advance for all of the physical regions $P_X$, wherein D is a value obtained by sorting virtual regions in a descending order using a difference value between the number of columns having faults and the number of spare columns and selecting virtual regions in which the faults are not repaired in the sorted order.

In those or other scenarios, the method may further include: when there is $R_X$, which is the number of spare rows available in each of the physical regions and set in advance, which is larger than 0, for all physical regions $P_X$ of the virtual region $V_D$, as the determining result, selecting one physical region $P_A$ in which ($P_X$, $V_D$) has a fault and $R_X$, which is the number of spare rows available in the physical region, has maximum value, by means of the analyzing device, $P_A$ being one of the physical regions $P_X$ and ($P_X$, $V_D$) representing cells, which are defined by $P_X$ and $V_D$, of the fault information management table; checking a row in which $A_D$, which is the number of columns having unrepaired faults in the selected virtual region $V_D$ is reduced at the most in ($P_A$, $V_D$) corresponding to the selected physical region $P_A$, by means of the analyzing device, ($P_A$, $V_D$) representing a cell, which is defined by $P_A$ and $V_Q$, of the fault information management table; reducing a value of ($f_{A,D}$) of ($P_A$, $V_D$) corresponding to the selected physical region $P_A$ as many as the number of faults which are repaired by the spare row, by means of the analyzing device, ($P_A$, $V_D$) representing a cell, which is defined by $P_A$ and $V_D$, of the fault information management table and ($f_{A,D}$) being the number of the unrepaired faults stored in the cell defined by $P_A$ and $V_D$; reducing $A_D$, which is the number of columns corresponding to the selected physical region $P_A$ which are not repaired and have faults, as many as the number of columns which are repaired by the spare row so that the fault repair is not necessary, by means of the analyzing device; reducing $R_A$, which is the number of available spare rows, as many as the number of used spare rows, by means of the analyzing device; and returning to a process of primarily checking whether $A_D$ which is the number of columns having unrepaired fault in the selected virtual region $V_D$, is equal to or smaller than $C_D$, which is the number of spare columns available in the virtual region $V_D$ to repeatedly perform a process of allocating the spare row to the selected virtual region $V_D$ until $A_D$, which is the number of columns having unrepaired faults in the selected virtual region $V_D$, is equal to or smaller than $C_D$, which is the number of spare columns available in the selected virtual region $V_D$, by means of the analyzing device.

In those or other scenarios, the method may further include: when there is no $R_X$, which is the number of spare rows available in each of the physical regions and set in advance, which is larger than 0, for all physical regions $P_X$, as the determining result, determining that the fault repair fails and ending the entire processes, by means of the analyzing device.

In those or other scenarios, the method may further include: when $A_D$, which is the number of columns having unrepaired fault in the selected virtual region $V_D$, is equal to or smaller than $C_D$, which is the number of spare columns available in the virtual region $V_D$, as the primarily checking result, secondarily checking whether $A_Y$, which is the number of columns having unrepaired fault in all of the virtual regions $V_Y$, is equal to or smaller than $C_Y$, which is the number of spare columns available in all of the virtual regions $V_Y$, by means of the analyzing device; when $A_Y$, which is the number of columns having unrepaired fault in all of the virtual regions $V_Y$, is equal to or smaller than $C_Y$, which is the number of spare columns available in all of the virtual regions $V_Y$, as the secondarily checking result, confirming that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in the storage medium 100 corresponding to the virtual region, and ending the entire processes, by means of the analyzing device; and when $A_Y$, which is the number of columns having unrepaired fault in all of the virtual regions $V_Y$, is larger than $C_Y$, which is the number of spare columns available in all of the virtual regions $V_Y$, as the secondarily checking result, selecting a next virtual region having unrepaired fault among the sorted virtual regions $V_Y$, by means of the analyzing device, wherein a value of the position information of K bits and a value of the position information of M+N−K bits are configured as vectors and positions of the bits are configured by "0" corresponding to a key value of the virtual basic region and "1" corresponding to a key value of the virtual sub region, and M, N, and K are natural numbers and K is equal to or smaller than M+N.

In those or other scenarios, the method may further include: when there is no available spare row and a value of $A_Y$ of the virtual region $V_Q$ is larger than a value of $C_Y$ of the virtual region $V_Q$, determining that the fault repair fails and ending the entire processes, by means of the analyzing device, $A_Y$ being the number of columns having unrepaired fault in each of the virtual regions, $C_Y$ being the number of spare columns available in each of the virtual regions and $V_Q$ being the virtual region in which the difference between $A_Y$ and $C_Y$ having the maximum value.

According to another aspect of the present solution, there is provided a memory management system including: a storage medium which stores a fault information management table related with a physical region and a virtual region; and an analyzing device which preferentially repairs a fault in the virtual region.

In some scenarios, the analyzing device may generate a fault information management table related with a physical region and a virtual region, selects a virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value, checks whether $A_Q$, which is the number of columns having unrepaired faults in the selected virtual region $V_Q$, is equal to or smaller than $C_Q$, which is the number of available spare columns in the selected virtual region $V_Q$, and determines whether there is $R_X$, which is the number of spare rows available in each of the physical regions and set in advance for all of the physical regions $P_X$, which is larger than 0 in the virtual region $V_Q$, when $A_Q$, which is the number of columns having unrepaired fault in the selected virtual region $V_Q$, is larger than $C_Q$, which is the number of available spare columns in the virtual region $V_Q$, as the checking result, and wherein Q is a value of a virtual region where a difference between the number of columns having fault and the number of spare columns has a maximum value.

In those or other scenarios, when $A_Q$, which is the number of columns having unrepaired faults in the selected virtual region $V_Q$, is equal to or smaller than $C_Q$, which is the number of available spare columns in the selected virtual region $V_Q$, as the checking result, the analyzing device determines that the fault repair is successfully completed, stores position information of K bits related with the virtual region, position information of M+N−K bits related with the virtual region, and a fault address according to an allocation result of the spare cell at a fault repair completion time in a fault address storage space which is managed by the physical region and the virtual region in the storage medium corresponding to the virtual region, and ends the entire processes, a value of the position information of K bits and a value of the position information of M+N−K bits are configured as vectors and positions of the bits are configured by "0" corresponding to a key value of the virtual basic region and "1" corresponding to a key value of the virtual sub region, and M, N, and K are natural numbers and K is equal to or smaller than M+N.

In those or other scenarios, when there is no $R_X$, which is the number of spare rows available in each physical region which is larger than 0 which is set in advance, for all physical regions $P_X$, as the determining result, the analyzing device determines that the fault repair fails and ends the entire processes.

In those or other scenarios, when there is no $R_X$, which is the number of spare rows available in each physical region which is larger than 0 which is set in advance, for all physical regions $P_X$, as the determining result, the analyzing device determines that the fault repair fails and ends the entire processes.

In those or other scenarios, when there is $R_X$, which is the number of spare rows available in each of the physical regions and set in advance, which is larger than 0, for all of the physical regions $P_X$ of the virtual region $V_Q$, as the determining result, the analyzing device: selects one physical region $P_A$ in which $(P_X, V_Q)$ has a fault and $R_X$, which is the number of spare rows available in the physical region, has maximum value, $P_A$ being one of the physical regions $P_X$ and $(P_A, V_Q)$ representing cells, which are defined by $P_X$ and $V_Q$, of the fault information management table; checks a row in which $A_Q$, which is the number of columns having unrepaired faults in the selected virtual region $V_Q$, is reduced at the most in $(P_A, V_Q)$ corresponding to the selected physical region $P_A$, $(P_A, V_Q)$ representing a cell, which is defined by $P_A$ and $V_Q$, of the fault information management table; reduces a value of $(f_{A,Q})$ of $(P_A, V_Q)$ corresponding to the selected physical region $P_A$ as many as the number of faults which are repaired by the spare row, $(P_A, V_Q)$ representing a cell, which is defined by $P_A$ and $V_Q$, of the fault information management table and $(f_{A,Q})$ being the number of the unrepaired faults stored in the cell defined by $P_A$ and $V_Q$; reduces $A_Q$, which is the number of columns corresponding to the selected physical region $P_A$ which are not repaired and have faults, as many as the number of columns which are repaired by the spare row so that the fault repair is not necessary; reduces $R_A$, which is the number of available spare rows, as many as the number of used spare rows; and returns to a process of selecting the virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of available spare columns in the selected virtual region $V_Q$.

According to still another aspect of the present solution, there is provided a memory management method including preferentially repairing a fault in a physical region, by means of an analyzing device.

In some scenarios, the preferentially repairing a fault in the physical region includes: generating a fault information management table related with a physical region and a virtual region, by means of the analyzing device; selecting a virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value, by means of the analyzing device; determining whether there is $R_X$, which is the number of spare rows available in each of the physical regions and set in advance, which is larger than 0, for all of the physical regions $P_X$, by means of the analyzing device; and when there is no $R_X$, which is the number of spare rows available in each of the physical regions which is larger than 0 which is set in advance, for all of the physical regions $P_X$, as the determining result, checking whether $A_Y$, which is the number of columns having unrepaired faults in all of the virtual regions, is equal to or smaller than the $C_Y$, which is the number of available spare columns in the virtual region, by means of the analyzing device, wherein Q is a value of a virtual region where a difference between the number of columns having fault and the number of spare columns has a maximum value.

In those or other scenarios, the method may further include: when $A_Y$, which is the number of columns having unrepaired fault in all of the virtual regions, is equal to or smaller than $C_Y$, which is the number of spare columns available in all of the virtual regions, as the checking result, confirming that the fault repair is successfully completed, storing position information of K bits related with the virtual region, position information of M+N-K bits related with the virtual region, and a fault address according to an allocation result of the spare cell at a fault repair completion time in a fault address storage space which is managed by the physical region and the virtual region in the storage medium 100 corresponding to the virtual region, and ending the entire processes, by means of the analyzing device, wherein a value of the position information of K bits and a value of the position information of M+N-K bits are configured as vectors and positions of the bits are configured by "0" corresponding to a key value of the virtual basic region and "1" corresponding to a key value of the virtual sub region and M, N, and K are natural numbers and K is equal to or smaller than M+N.

In those or other scenarios, the method may further includes: when $A_Y$, which is the number of columns having unrepaired fault in all the virtual regions, is larger than $C_Y$, which is the number of available spare columns in the virtual region, as the checking result, determining that the repair is unable only by using the spare rows available in the virtual region $V_Y$ and the fault repair fails and ending the entire processes, by means of the analyzing device.

In those or other scenarios, the method may further includes: when there is $R_X$, which is the number of spare rows available in each of the physical regions and set in advance, which is larger than 0, for all of the physical regions $P_X$ of the virtual region $V_Q$, as the determining result, selecting one physical region $P_A$ in which $(P_X, V_Q)$ has a fault and $R_X$, which is the number of spare rows available in the physical region, has maximum value, by means of the analyzing device, $P_A$ being one of the physical regions $P_X$ and $(P_A, V_Q)$ representing cells, which are defined by $P_X$ and $V_Q$, of the fault information management table; checking a row in which $A_Q$, which is the number of columns having unrepaired faults in the selected virtual region $V_Q$, is reduced at the most in $(P_A, V_Q)$ corresponding to the selected physical region $P_A$, by means of the analyzing device, $(P_A, V_Q)$ representing a cell, which is defined by $P_A$ and $V_Q$, of the fault information management table; reducing a value of $(f_{A,Q})$ of $(P_A, V_Q)$ corresponding to the selected physical region $P_A$ as many as the number of faults which are repaired by the spare row, by means of the analyzing device, $(P_A, V_Q)$ representing a cell, which is defined by $P_A$ and $V_Q$, of the fault information management table and $(f_{A,Q})$ being the number of the unrepaired faults stored in the cell defined by $P_A$ and $V_Q$; reducing $A_Q$, which is the number of columns corresponding to the selected physical region $P_A$ which are not repaired and have faults, as many as the number of columns which are repaired by the spare row so that the fault repair is not necessary, by means of the analyzing device; reducing $R_A$, which is the number of available spare rows, as many as the number of used spare rows, by means of the analyzing device; and returning to a process of selecting the virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of available spare columns in the selected virtual region $V_Q$, by means of the analyzing device.

In those or other scenarios, the preferentially repairing a fault in the physical region may include: generating the fault information management table related with the physical region and the virtual region, by means of the analyzing device; calculating a difference value $A_Y-C_Y$, which is difference between $A_Y$, which is the number of columns having unrepaired fault in each of the virtual regions included in the fault information management table, and $C_Y$, which is the number of spare columns available in each of the virtual regions included in the fault information management table, by means of the analyzing device; sorting the calculated difference value $A_Y-C_Y$ and the virtual regions $V_Y$ corresponding to the difference value $A_Y-C_Y$ based on the calculated difference value $A_Y-C_Y$, by means of the analyzing device; selecting a virtual region $V_D$ in which the fault is not repaired, in the sorted order, by means of the analyzing device; primarily checking whether $A_D$, which is the number of columns having unrepaired fault in the selected virtual region $V_D$, is equal to or smaller than $C_D$, which is the number of spare columns available in the virtual region $V_D$, by means of the analyzing device; when the $A_D$ is larger than the $C_D$, as the primarily checking result, determining that the repair is unable only by the spare column and in order to perform the repair using the spare row, primarily determining whether there is $R_X$ which is larger than 0 in the virtual region $V_D$, for all physical regions $P_X$, by means of the analyzing device, $R_X$ being the number of spare rows available in each of the physical regions and being set in advance for all of the physical regions $P_X$; when there is $R_X$, which is the number of spare rows available in each of the physical regions and set in advance, which is larger than 0, for all physical regions $P_X$ of the virtual region $V_D$, as the primarily determining result, selecting one physical region $P_A$ in which $(P_X, V_D)$ has a fault and $R_X$, which is the number of spare rows available in the physical region, has maximum value, by means of the analyzing device, $P_A$ being one of the physical regions $P_X$ and $(P_X, V_D)$ representing cells, which are defined by $P_X$ and $V_D$, of the fault information management table; and checking a row in which $A_D$, which is the number of columns having unrepaired faults in the selected virtual region $V_D$ is reduced at the most in $(P_A, V_D)$ corresponding to the selected physical region $P_A$, by means of the analyzing device, $(P_A, V_D)$ representing a cell, which is defined by $P_A$ and $V_Q$, of the fault information management table, wherein D is a value obtained by sorting virtual regions in a descending order using a difference value between the number of columns having faults and the number of spare columns and selecting virtual regions in which the faults are not repaired in the sorted order.

In those or other scenarios, the method may further include: reducing a value of $(f_{A,D})$ of $(P_A, V_D)$ corresponding to the selected physical region $P_A$ as many as the number of faults which are repaired by the spare row, by means of the analyzing device, $(P_A, V_D)$ representing a cell, which is defined by $P_A$ and $V_D$, of the fault information management table and $(f_{A,D})$ being the number of the unrepaired faults stored in the cell defined by $P_A$ and $V_D$; reducing $A_D$, which is the number of columns corresponding to the selected physical region $P_A$ which are not repaired and have faults, as many as the number of columns which are repaired by the spare row so that the fault repair is not necessary, by means of the analyzing device; reducing $R_A$, which is the number of available spare rows, as many as the number of used spare rows, by means of the analyzing device; and returning to a process of primarily checking whether $A_D$ which is the number of columns having unrepaired fault in the selected virtual region $V_D$, is equal to or smaller than $C_D$, which is the number of spare columns available in the virtual region $V_D$ to repeatedly perform a process of allocating the spare row to the selected virtual region $V_D$ until $A_D$, which is the number of columns having unrepaired faults in the selected virtual region $V_D$, is equal to or smaller than $C_D$, which is the number of spare columns available in the selected virtual region $V_D$, by means of the analyzing device.

In those or other scenarios, the method may further include: when there is no $R_X$, which is the number of spare rows available in each of the physical regions and set in advance, which is larger than 0 which is set in advance, for all physical regions $P_X$, as the primarily determining result, determining that the fault repair fails and ending the entire processes, by means of the analyzing device.

In those or other scenarios, the method may further include: when $A_D$, which is the number of columns having unrepaired fault in the selected virtual region $V_D$, is equal to or smaller than $C_D$, which is the number of spare columns available in the virtual region $V_D$, as the primarily checking result, secondarily checking whether $A_Y$, which is the number of columns having unrepaired fault in all of the virtual regions $V_Y$, is equal to or smaller than $C_Y$, which is the number of spare columns available in all of the virtual regions $V_Y$, by means of the analyzing device; when $A_Y$, which is the number of columns having unrepaired fault in all of the virtual regions $V_Y$, is equal to or smaller than $C_Y$, which is the number of spare columns available in all of the virtual regions $V_Y$, as the secondarily checking result, secondarily determining whether there is $R_X$, which is the number of spare rows available in each of the physical regions and set in advance, which is larger than 0, for all physical regions $P_X$, by means of the analyzing device; when there is $R_X$, which is the number of spare rows available in each of the physical regions and set in advance, which is larger than 0, for all of the physical regions $P_X$, as the secondarily determining result, selecting a next virtual region $V_D$ in which the fault is not repaired in the sorted order, by means of the analyzing device; when there is no $R_X$, which is the number of spare rows available in each of the physical regions and set in advance, which is larger than 0, for all physical regions $P_X$, as the secondarily determining result, determining that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in the storage medium corresponding to the virtual region, and ending the entire processes, by means of the analyzing device; and when $A_Y$, which is the number of columns having unrepaired fault in all of the virtual regions $V_Y$, is larger than $C_Y$, which is the number of spare columns available in all of the virtual regions $V_Y$, as the secondarily checking result, returning to the process of selecting a virtual region in which the fault is not repaired among all the sorted virtual regions $V_Y$, by means of the analyzing device.

In those or other scenarios, the method may further include: when there is no available spare row and a value of $A_Y$ of the virtual region $V_Q$ is larger than a value of $C_Y$ of the virtual region $V_Q$, determining that the fault repair fails and ending the entire processes, by means of the analyzing device, $A_Y$ being the number of columns having unrepaired fault in each of the virtual regions, $C_Y$ being the number of spare columns available in each of the virtual regions and $V_Q$ being the virtual region in which the difference between $A_Y$ and $C_Y$ having the maximum value.

According to the present solution, restricted spare cells are optimally distributed (or allocated) into a physical region and a virtual region in a system for repairing a fault of a memory, thereby increasing a yield of a memory chip.

Further, according to the present solution, sub arrays serve as physical regions which are unit regions and virtual regions obtained by recombining the sub arrays are optimally distributed in separate spare cells to maximize fault repair, thereby increasing a possibility of utilizing extra spare cells according to a purpose of the system.

According to the present solution, it is possible to provide allocation of spare cells which simultaneously satisfy not only a designed target value of a virtual region but also a designed target value of a physical region. It is also possible to provide an optimal efficiency using a minimum number of spare cells for the physical region and the virtual region by storing position information of K bits related with the virtual region, position information of M+N−K bits related with the virtual region, and a fault address according to an allocation result of the spare cell at a fault repair completion time in a fault address storage space which is managed by the physical region and the virtual region in the storage medium.

According to the present solution, an entire repair time can be shortened by repeatedly performing a repair on a selected virtual region by a fast column-first algorithm and a fast row-first algorithm using a column or a row and then performing a repair on a next virtual region.

BRIEF DESCRIPTION OF THE DRAWINGS

FIGS. 3,4 and 5 are views illustrating an example of configuring the most optimal cache memory when 4-way set-associative cache is implemented using 4×4 memory blocks including a fault block.

FIGS. 11,12, 13, 14, 15, 16, 17, 18, 19, 20, 21, 22, 23, 24, 25, 26 and 27 are views illustrating an example of performing a repair on a fault cell using a column-first algorithm.

FIG. 30 is a view illustrating a state in which difference values are arranged.

FIGS. 31, 32, 33, 34, 35, 36, 37, 38, 39, 40, 41, 42, 43, 44, 45 and 46 are views illustrating an example of performing a repair on a fault cell using a fast column-first algorithm.

DETAILED DESCRIPTION

Figure 1:
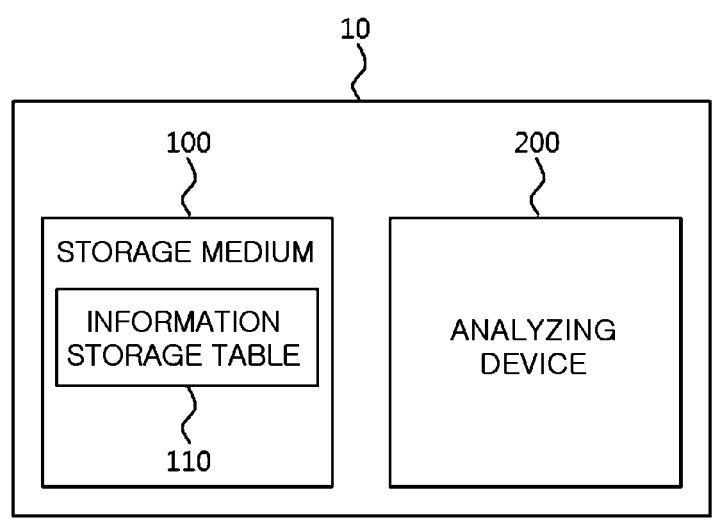
FIG. 1 is a block diagram illustrating a configuration of an entire analyzing system configured by an information storage table configured by a plurality of unit regions and an analyzing device which finds out optimal information storage.
Figure 2:
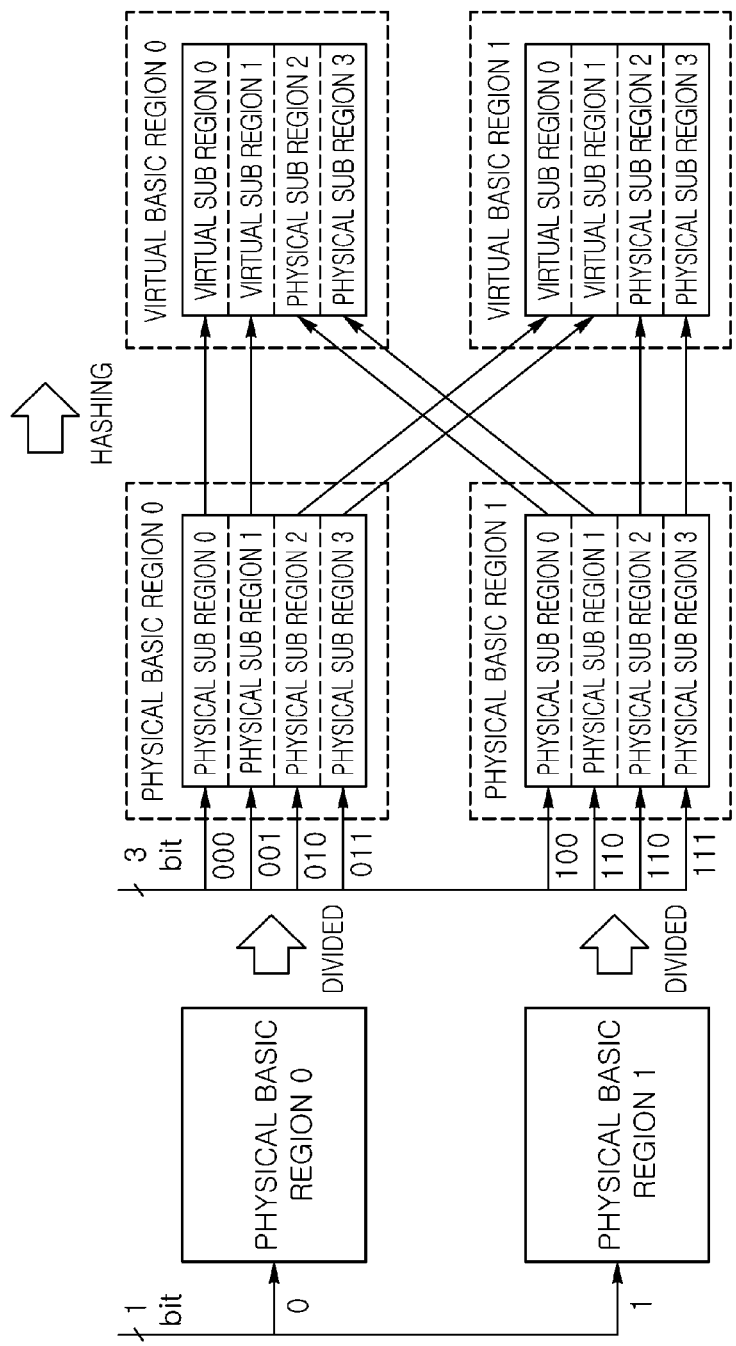
FIG. 2 is a view illustrating an example that divides a physical basic region which is a unit for hashing an information storage location into a plurality of physical sub regions having same size.

It should be noted that technical terminologies used in the present invention are used to describe a specific exemplary embodiment but are not intended to limit the present invention. Further, the technical terminologies which are used in the present invention should be interpreted to have meanings that are generally understood by those with ordinary skill in the art to which the present invention pertains, unless specifically defined to have different meanings in the present invention, but not be interpreted as an excessively comprehensive meaning or an excessively restricted meaning. Further, if a technical terminology used in the present invention is an incorrect technical terminology which does not precisely describe the spirit of the present invention, the technical terminology should be replaced with and understood as a technical terminology which may be correctly understood by those skilled in the art. Further, a general terminology used in the present invention should be interpreted as defined in a dictionary or in accordance with the context, but not be interpreted as an excessively restricted meaning.

A singular form used in the present invention may include a plural form unless it has a clearly opposite meaning in the context. Terminologies such as "be configured by" or "include" in the present invention should not be interpreted to necessarily include all of plural components or plural steps described in the present invention, but should be interpreted not to include some of the components or steps or to further include additional components or steps.

Further, terminologies including an ordinal number such as first or second which is used in the present invention may be used to explain components, but the components are not limited by the terminologies. The terminologies are used only for distinguishing one component from another component. For example, without departing from the scope of the present invention, the first component may be referred to as the second component, and similarly, the second component may also be referred to as the first component.

Hereinafter, exemplary embodiments according to the present disclosure will be described in detail with reference to the accompanying drawings, and the same or similar components are denoted by the same reference numerals regardless of reference numerals, and repeated description thereof will be omitted.

In describing the present disclosure, when it is determined that a detailed description of a related publicly known technology may obscure the gist of the present disclosure, the detailed description thereof will be omitted. Further, it should be noted that the accompanying drawings are used just for easily appreciating the spirit of the present disclosure and it should not be interpreted that the spirit of the present disclosure is limited by the accompanying drawings.

FIG. 1 is a block diagram illustrating a configuration of an entire analyzing system 10 configured by an information storage table configured by a plurality of unit regions and an analyzing device which finds out optimal information storage.

As illustrated in FIG. 1, the analyzing system 10 includes a storage medium 100 and an analyzing device 200. However, all the components of the analyzing system 10 illustrated in FIG. 1 are not essential components, but the analyzing system 10 may be implemented by more components or less components than the components illustrated in FIG. 1.

The storage medium 100 may be any one of a dynamic random access memory (DRAM), a random access memory (RAM), a static random access memory (SRAM), a read-only memory (ROM), an electrically erasable programmable read-only memory (EEPROM), a programmable read-only memory (PROM), a phase change memory (PCM), and a magnetoresistance random access memory (MRAM).

Further, the storage medium 100 includes an information storage table 110.

The information storage table 110 includes information related with a physical region (or address information related with a physical region), information related with a virtual region (or address information related with a virtual region), data (or information), and the like. Here, the information related with the physical region includes position information of a physical basic region and position information of a physical sub region. Further, the information related with the virtual region includes position information of a virtual basic region and position information of a virtual sub region. In this case, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

The analyzing device 200 performs an overall control function of the analyzing system 10.

Further, the analyzing device 200 finds out an optimal information storage location (or position information of K bits and position information of M+N−K bits which satisfy a predetermined target value) of the analyzing system 10 and allocates the position information of K bits and the position information of M+N−K bits corresponding to the found optimal information storage location to the analyzing system 10.

Further, the analyzing device 200 maps an information management unit region (or a unit region), which hashes the information storage location, to the physical basic region in the information storage table 110. Here, the information storage table 110 is included in the storage medium 100 and configured by a plurality of unit regions.

In this case, when a basic region in which the information is to be stored and managed in the memory system such as a DRAM, a PCM, an MRAM, or a SRAM is a bank, the analyzing device 200 combines all rows in one bank and divides all the combined rows into $2^M$ physical basic regions and maps the unit regions to the divided $2^M$ physical basic regions.

Further, when the number of physical basic regions to be managed in the storage medium 100 is not $2^M$, the analyzing device 200 may make a plurality of units in the storage medium 100 be $2^M$, and then map the $2^M$ unit regions to the $2^M$ physical basic regions. Here, M may be a natural number.

That is, in order to configure $2^M$ unit regions according to the design of the designer, when the number of unit regions is not $2^M$, the analyzing device 200 performs a preprocessing process of mapping existing unit regions to $2^M$ new unit regions according to the design of the designer and maps the preprocessed $2^M$ unit regions to the $2^M$ physical basic regions.

Further, the analyzing device 200 divides each of the plurality of physical basic regions in the storage medium 100 (or the information storage table 110) into a plurality of physical sub regions. Here, each of the plurality of physical sub regions has same size.

That is, the analyzing device 200 divides each of the $2^M$ physical basic regions in the storage medium 100 (or the information storage table 110) into $2^N$ physical sub regions. Here, N may be a natural number. In this case, when one physical basic region is divided into N physical sub regions to be hashed, an additional bit may be required to index the physical sub regions.

Further, the analyzing device 200 combines (or configures) a plurality of physical sub regions, which are configured by $2^{M+N}$ physical sub regions and indexed with M+N bits, into $2^K$ virtual basic regions. In this case, K is a natural number and may be equal to or smaller than M+N. Here, when bits for approaching the physical basic region are M bits and bits for approaching the physical sub region are N bits, a number of combinationable cases to generate the virtual basic region is $_{M+N}C_{M+N-K}$. Further, the size of K may be a bit rate to approach the information storage table 110.

Further, the analyzing device 200 divides (or resets) each of the generated $2^K$ virtual basic regions into $2^{M+N-K}$ virtual sub regions. Here, each of the $2^{M+N-K}$ virtual sub regions has same size.

That is, the analyzing device 200 combines the physical sub regions and sets a key value of the virtual basic regions in the unit of bit which is set in advance from the most significant bit to the least significant bit and sets a bit (or a remaining region) remaining after setting the key value of the virtual basic regions among the M+N bits as a key value of the virtual sub regions to configure the key of the entire virtual regions. The entire virtual regions includes the virtual basic regions and virtual sub regions. Here, the analyzing device 200 generates respectively position information of K bits for obtaining the key value of the virtual basic regions and position information of M+N−K bits for obtaining the key value of the virtual sub regions, in order to configure the key (or a key of the entire virtual region) of the virtual regions.

As described above, the analyzing device 200 may configure a hash function for obtaining (or setting) the key value of the virtual basic regions using the position information of K bits among the M+N bits and for obtaining the key value of the virtual sub regions using position information of a bit remaining after setting the key value of the virtual basic regions among the M+N bits. Here, the hash function provides position information (for example, including position information of K bits and position information of M+N−K bits) related with the virtual region based on physical regions addresses.

Further, the analyzing device 200 checks (or determines) whether a number (or a number of combined/recombined information) of information to be stored in the virtual basic region (or a combination of the virtual basic regions) which is temporarily combined (or configured) satisfies a predetermined target value. Here, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) which is same with the number of available (or available in the memory system) spare cells which are provided in the memory cell. That is, the target value may be the number of resources which may be available in all physical basic regions which map to a predetermined value corresponding to the information to be stored. Further, in the case of a memory system which avoids a fault memory block, the target value may be a number of same memory blocks which are available in all physical basic regions of the memory system.

As a checking result (or a determining result), when the number of information to be stored in the combined (or configured/generated) virtual basic region (or a combination of the virtual basic regions) satisfies a predetermined target value, the analyzing device 200 stores the position information of K bits related with the virtual basic region which satisfies the target value among the M+N bits and the position information of M+N−K bits related with the virtual sub region which satisfies the target value in a predetermined (or a previously allocated) storage region in the storage medium 100. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

That is, when the number of information to be stored in the combined (or configured/generated) virtual basic region (or a combination of the virtual basic regions) satisfies a predetermined target value, the analyzing device 200 generates a position of K bits corresponding to the virtual basic region which satisfies the target value and a position of M+N−K bits corresponding to the virtual sub region which satisfies the target value, among the M+N bits. Further, the analyzing device 200 stores the generated position (or position information of K bits) of K bits and the generated position (or position information of M+N−K bits) of M+N−K bits as vectors in a predetermined storage region in the storage medium 100.

Further, the analyzing device 200 determines that the information storage table 110 may be successfully managed, based on the position information (or position information of K bits related with the virtual basic region which satisfies the target value) of K bits and the position information (or position information of M+N−K bits related with the virtual sub region which satisfies the target value) of M+N−K bits stored in the predetermined storage region in the storage medium 100 and stores data corresponding to the position information (or position information for the virtual region) of the virtual region in the information storage table 110. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

Further, as a checking result (or a determining result), when the number of information to be stored in the combined (or configured/generated) virtual basic region (or a combination of the virtual basic regions) does not satisfy a predetermined target value, the analyzing device 200 repeatedly performs processes of recombining the plurality of physical sub regions according to a predetermined hashing method (or based on a predetermined hash function/ with respect to a position of another K bit) excluding a previously combined case (or a plurality of cases combined according to the hashing method/a plurality of recombined cases) among the number of combinationable cases (for example, $_{M+N}C_{M+N-K}$) to check the recombined virtual basic region and checking whether the number of information to be stored in the checked recombined virtual basic region satisfies the predetermined target value.

As described above, the analyzing device 200 checks a combination of first physical sub regions which satisfy a target value to be designed by the virtual basic region in all configurable combinations for the plurality of physical sub regions.

Further, when the target value is not satisfied for all combinations of positions of K bits among M+N bits, the analyzing device 200 determines that the data cannot be stored (or the information storage table 110 cannot be successfully managed) and ends the entire processes.

Figure 4:
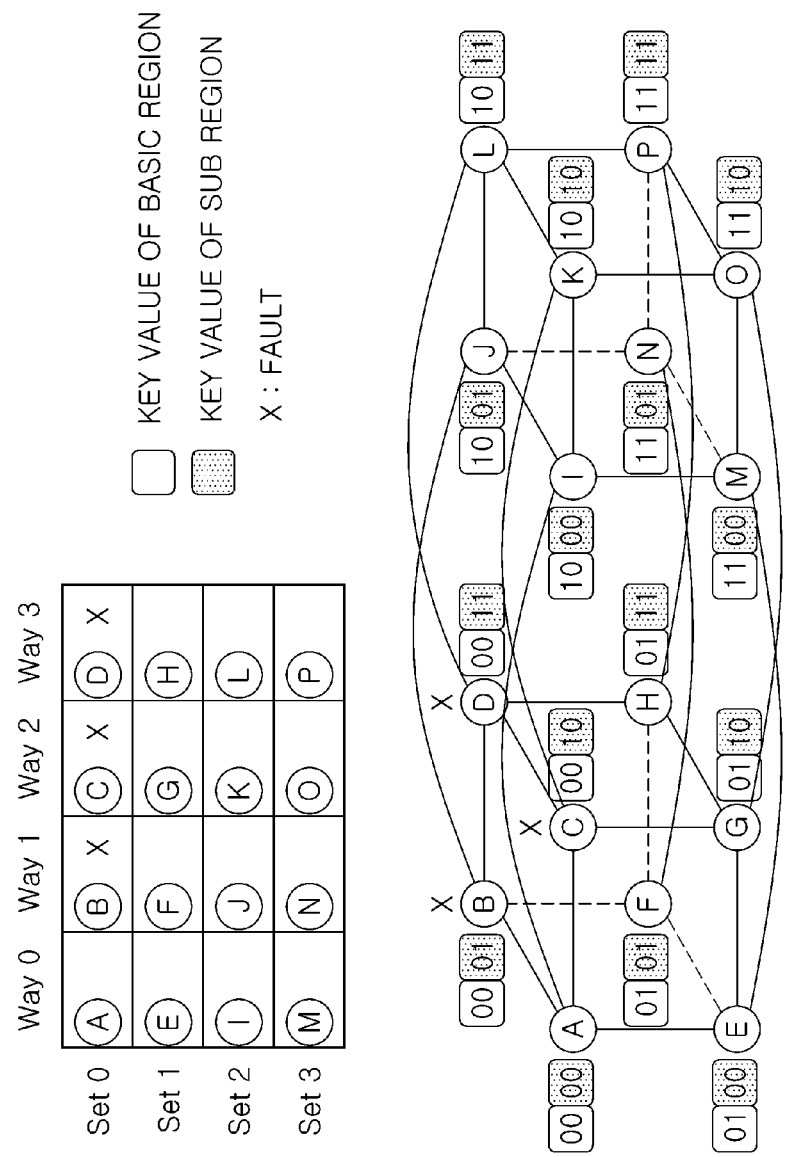
Figure 5:
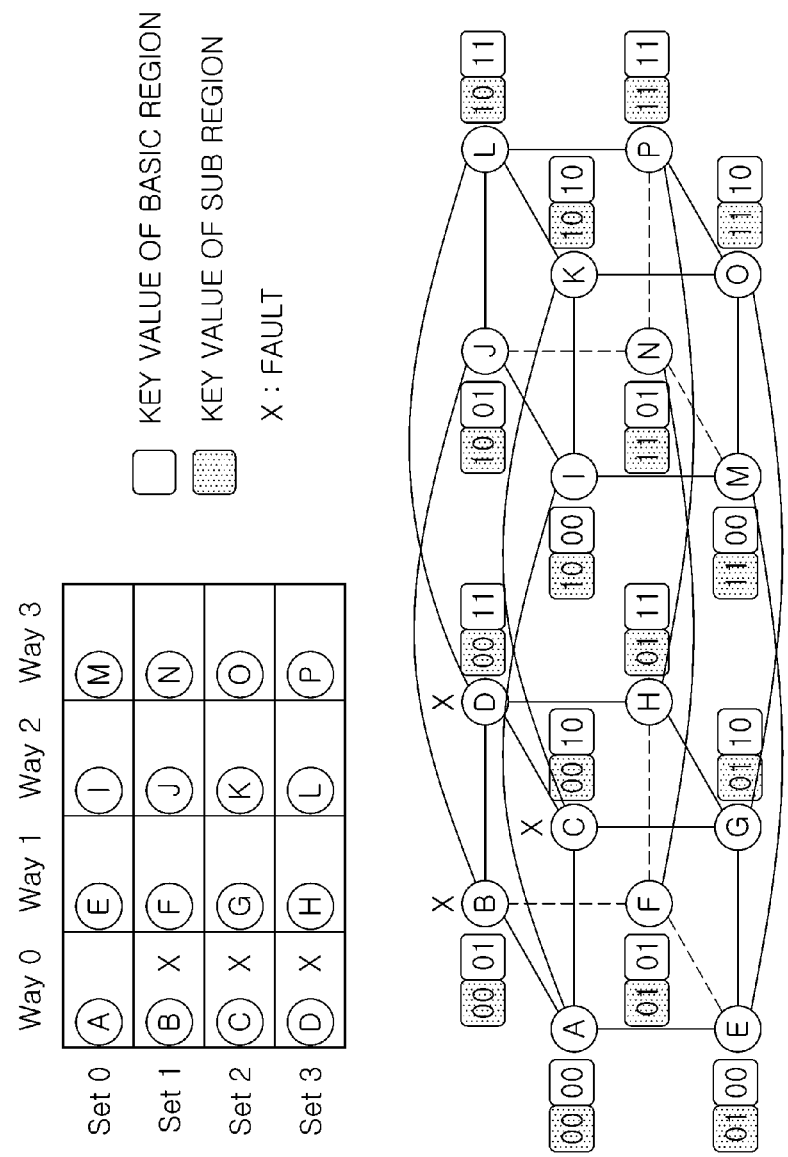

FIGS. 3 to 5 are views illustrating an example of configuring the most optimal cache memory when 4-way set-associative cache is implemented using 4×4 memory blocks including a fault block. Since three blocks among a total of 16 memory blocks have faults, when the 4-way set-associative cache is configured, a target value (or a designed target value) is to allocate one fault to each set.

Further, since the cache is 4-way set-associative cache, K is 2.

Further, as illustrated in FIG. 3, when a 4-way cache memory is to be configured, the analyzing device 200 maps unit regions configured by row addresses to physical basic regions to configure physical basic regions which will be four physical basic regions and configure each of the physical basic regions with four physical sub regions.

Therefore, the analyzing device 200 applies hashing with a total of four bits of higher two bits approaching a physical basic region and lower two bits approaching a physical sub region in the approached physical basic region to approach the physical sub region.

Further, as illustrated in FIG. 4, when the hashing is performed with the virtual basic region (or the physical basic region), three fault blocks are allocated when approaching set 0, so that a target value is not satisfied.

Further, as illustrated in FIG. 5, when among four bits which approach the physical sub region to hash the virtual basic region, the lower two bits are used as an address (or the position information of K bits) to approach the virtual basic region and the upper two bits are used as an address (or the position information of M+N−K bits) to approach the virtual sub region in the virtual basic region, it is managed that one fault block is generated in each virtual basic region. Therefore, the target value may be satisfied. As a result, performance degradation of the entire system is minimized so that the cache memory may be configured to exhibit optimal performance.

Figure 6:
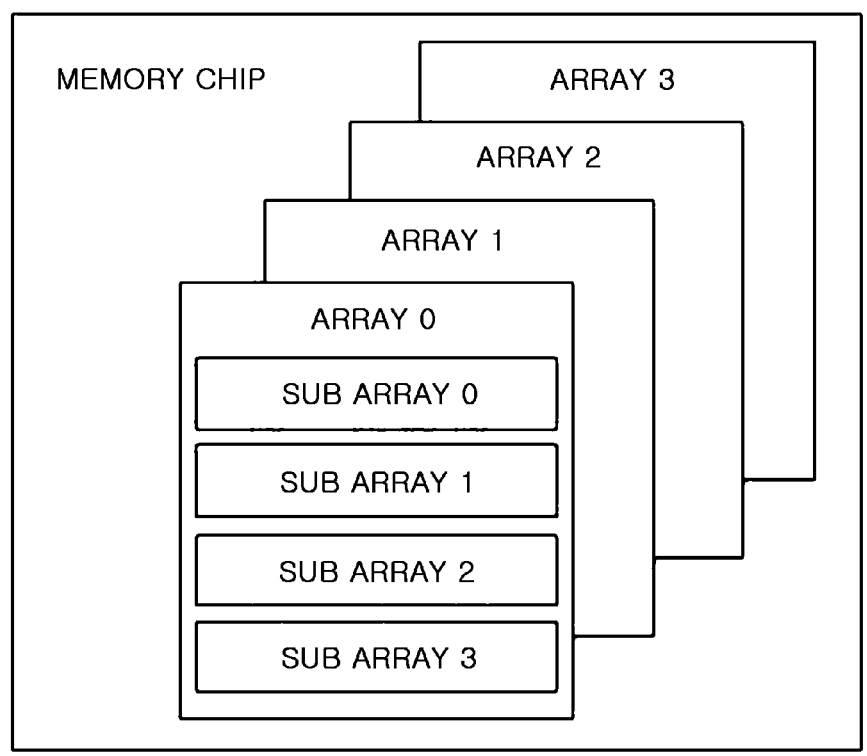
FIGS. 6, 7 and 8 are views illustrating an example which applies the present solution to a step of storing a fault address in a memory chip such as a DRAM.
Figure 7:
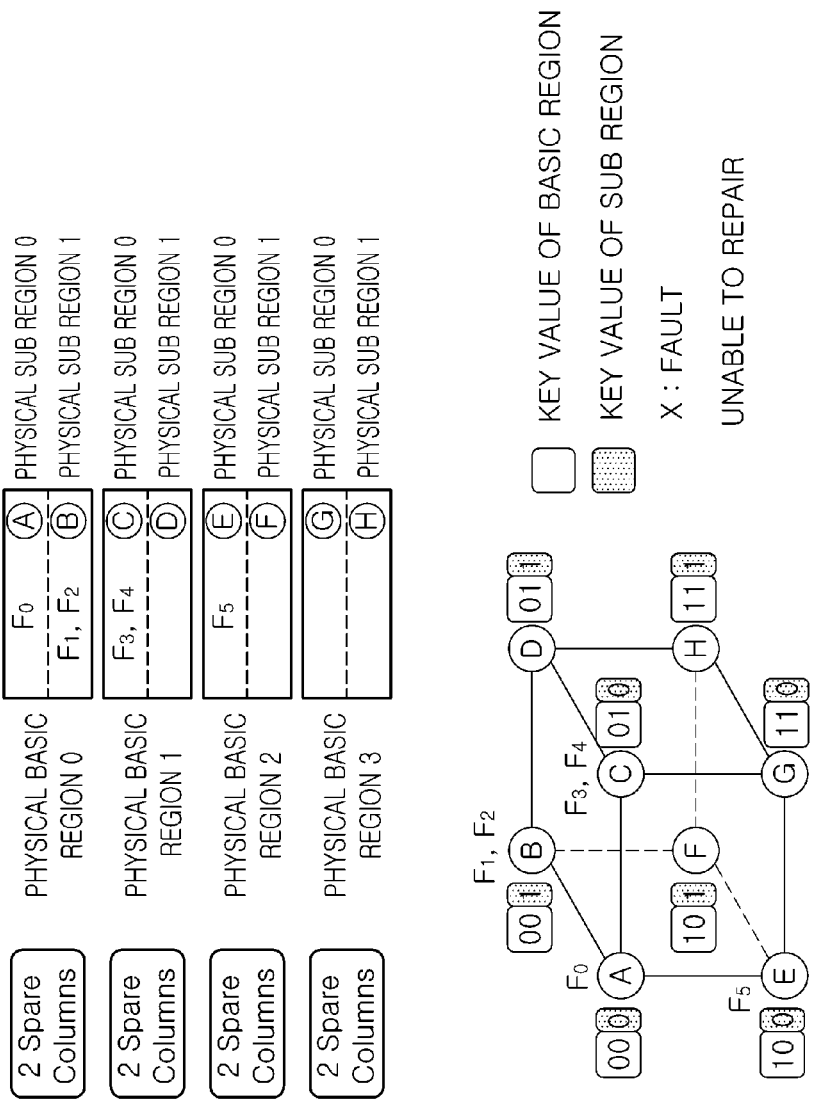
Figure 8:
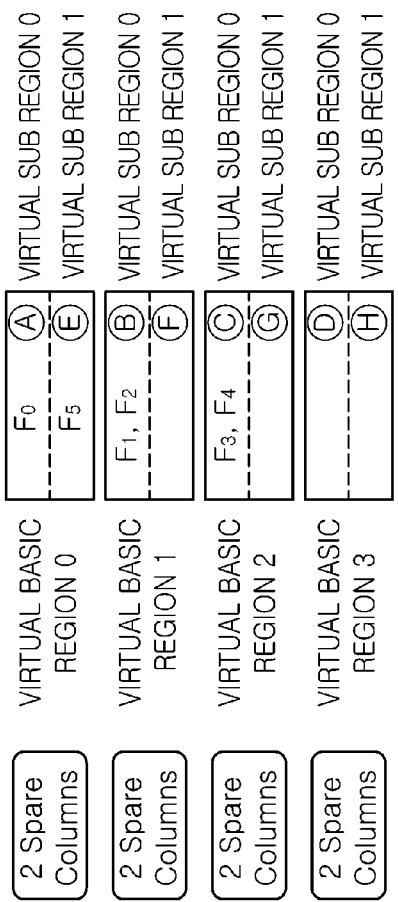
Figure 8:
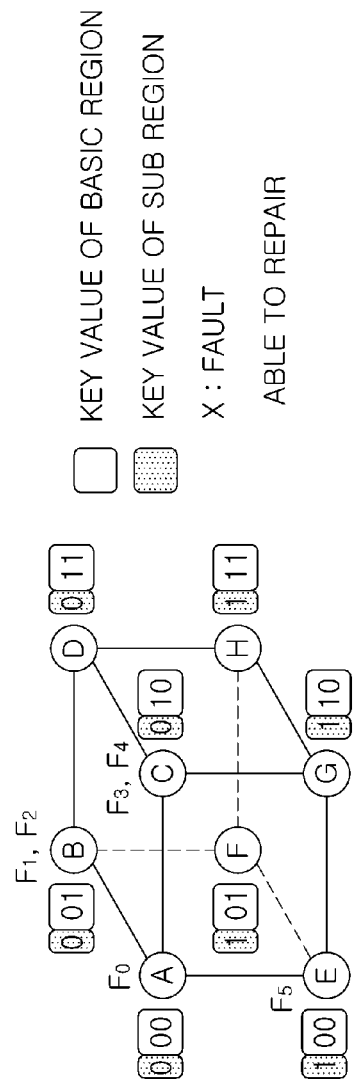

FIGS. 6 to 8 are views illustrating an example which applies the present solution to a step of storing a fault address in a memory chip such as a DRAM.

Further, as illustrated in FIG. 6, the DRAM memory chip is configured by a plurality of arrays.

Further, the array is configured by a plurality of sub arrays with a smaller size than that of the array.

When a fault is generated in the memory chip configured as described above, in order to perform repair while storing and managing an address where the fault is generated, the repair is performed on one sub array or on a plurality of sub arrays.

Therefore, in the related art, even though there is a sub array having a remaining space to store the fault address in the array, the sub array cannot be used. However, a storage space of a fault address of another sub array which remains in the array is utilized so that a storage space in the memory may be continuously used.

Further, when the DRAM memory chip illustrated in FIG. 6 is applied to the present solution, the sub array in the array serves as a unit region and the unit region serves as a physical basic region. The physical sub region in the physical basic region is obtained by dividing the sub array by the number of physical sub regions.

Further, since the fault is managed and cured (or repaired) for every physical basic region, an entry number of the information storage table 110 for managing a fault address is equal to the number of physical basic area. As a result, K is 2.

Further, when the sub arrays in the array have different sizes, the sub arrays are combined to be one, the combined sub arrays are divided into $2^M$ virtual sub arrays, and the divided virtual sub arrays are mapped to the physical sub arrays.

Further, when it is assumed that a number of faults which is repaired by one sub array is 2, 2 is a target value. Further, a total of three faults are generated in addresses $F_0$, $F_1$, and $F_2$ in a physical basic region 0 (or a sub array 0) illustrated in FIG. 7, which exceeds two faults to be repaired for the sub array 0.

That is, as illustrated in FIG. 7, two faults can be repaired for every physical basic region and a total number of physical basic regions is four so that eight faults may be repaired at the most. However, there may be a case that the faults cannot be repaired when the total number of faults $F_0$ to $F_5$ is just six as illustrated in FIG. 7.

As described above, FIG. 7 illustrates an example that divides each of the physical basic regions into two physical sub regions and combines the physical sub regions into virtual basic regions.

That is, the analyzing device 200 divides each of the physical basic regions into two physical sub regions and combines the physical sub regions into the virtual basic regions. Here, to hash a basic region, highest two bits (or position information of K bit) are used as a key value of the basic region and the lowest one bit (or position information of M+N−K bit) is used as a key value of the sub region. Therefore, when the virtual basic region is equal to the physical basic region, a storage space for a total of three fault addresses is required in the physical basic region (or a virtual basic region) 0. However, the provided storage space is limited to two for every basic region, which exceeds a limitation for managing a fault address.

Further, as illustrated in FIG. 8, the analyzing device 200 divides each of the physical basic regions into two physical sub regions and combines the physical sub regions into the virtual basic regions. Here, to hash basic regions, lowest two bits (or position information of K bits) are used as a key value of the basic region and the highest one bit (or position information of M+N−K bits) is used as a key value of the sub region. Therefore, all the fault addresses of the virtual basic regions do not exceed two, so that all fault addresses may be stored. In this case, since different physical basic regions are combined, a tag bit may be considered to distinguish an address corresponding to a physical basic region. However, the tag bit may not be used according to the design of the designer.

Further, for example, information of the hash function may be generated as a vector which sets a bit (or position information of K bits) which selects the virtual basic region to be 0 and sets a bit (or position information of M+N−K bits) which selects the virtual sub region to be 1.

Further, since a total number of generated virtual sub regions is eight, from $\log_2(8)=3$, lower two bits among bits which are used to index a total of three bits become virtual basic regions. Therefore, in FIG. 8, a value obtained by storing the bit (or position information of K bits) which selects the virtual basic region and the bit (or position information of M+N−K bits) which selects the virtual sub region as a vector is 100.

Further, for a memory management method, as illustrated in FIG. 1, an analyzing system (or a memory management system) 10 includes a storage medium 100 and an analyzing device 200.

The storage medium 100 includes an information storage table 110.

Further, the storage medium 100 (or the information storage table 110) stores the position information of K bits (or position information of K bits related with the virtual basic region which satisfies the target value) and the position information of M+N−K bits (or position information of M+N−K bits related with the virtual sub region which satisfies the target value) in a predetermined storage region in the storage medium 100 by control of the analyzing device 200.

Further, the storage medium 100 (or the information storage table 110) stores data corresponding to the position of the virtual region information (or position information related with the virtual region) in the information storage table 110 (or a fault address storage space in the storage medium 100) based on the position information of K bits (or position information of K bits related with the virtual basic region which satisfies the target value) and the position information of M+N−K bits (or position information of M+N−K bits related with the virtual sub region which satisfies the target value) which are stored in a storage region, by the control of the analyzing device 200. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the corresponding memory system.

Further, the storage medium 100 stores a plurality of column addresses and a plurality of row addresses.

Further, the storage medium 100 stores a fault information management table generated by the analyzing device 200.

Further, the analyzing device (or a memory management unit) 200 generates a fault information management table representing a relationship of $(f_{X,Y})$ which is number of faults, $R_X$ which is the number of spare rows available in each of the physical regions, $C_Y$ which is the number of available spare columns in each of the virtual regions, and $A_Y$ which is the number of columns in each of the virtual regions having unrepaired faults, for a physical region (or a physical basic region $P_X$) and a virtual region (or a virtual basic region $V_Y$). In this case, X denotes a physical region and Y denotes a virtual region.

Here, the virtual region may be one of all combinations which are configurable by the analyzing device 200 where the analyzing device 200 divides each of the physical basic regions into two physical sub regions having same size and combines the physical sub regions into the virtual basic regions.

Further, the analyzing device 200 checks whether all configurable combinations satisfy a target value which is set in advance by the memory management method. In this case, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) of available (or available in the memory system) spare cells which are provided in the memory cell. That is, the target value may be a number of same resources which may be available in all physical basic regions which map to a predetermined value corresponding to the information to be stored. Further, in the case of a memory system which avoids a fault memory block, the target value may be a number of same memory blocks which are available in all physical basic regions of the memory system.

When the number of information to be stored in the combined virtual basic region satisfies a predetermined target value, the analyzing device 200 stores the position information of K bits related with the virtual basic region which satisfies the target value among the M+N bits and the position information of M+N−K bits related with the virtual sub region which satisfies the target value in a predetermined (or previously allocated) storage region in the storage medium 100. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region. Here, M represents a number of physical regions, N represents a number of virtual regions, and M, N, and K are natural numbers. Further, the size of K may be a bit rate to approach the information storage table 110.

That is, in order to find position information of K bits and position information of M+N−K bits which satisfy the target value, the analyzing device 200 creates a fault information management table to optimally allocate information to an information storage space.

Figure 9:
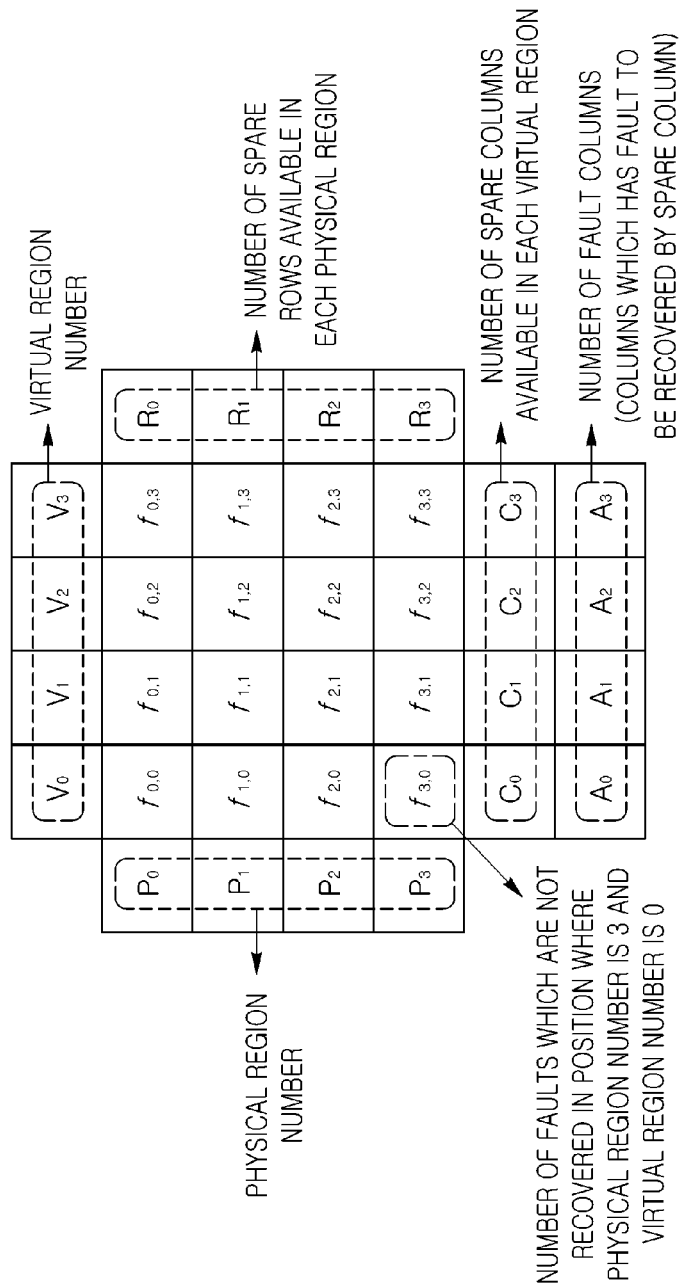
FIG. 9 is a view illustrating a fault information management table which is used to allocate a fault cell to an optimal spare cell.

In some scenarios, the target value is a predetermined number which may be the number of available spare cells (which is available in the memory system) provided in the memory system. As illustrated in FIG. 9, position information of a fault cell is optimally allocated to the information storage table 110 to generate a fault information management table for fault repair.

Further, it is assumed that M physical regions are provided and each physical region has N virtual regions and the physical region is denoted by a reference character X and the virtual region is denoted by a reference character Y. Here, X satisfies that $0 \leq X \leq M-1$ and Y satisfies that $0 \leq Y \leq N-1$.

Further, as illustrated in FIG. 9, when M=4 and N=4, $P_X$ indicates an X-th physical region of the memory management system 10 and $V_Y$ indicates a Y-th virtual region of the memory management system 10. For example, $P_0$ indicates a zeroth physical region and $V_2$ indicates a second virtual region. Further, $(f_{X,Y})$ indicates a number of faults which are not repaired among faults generated in $(P_X, V_Y)$ which represents a cell defined by the physical region $P_X$ and the virtual region $V_Y$. Further, the physical region is divided into several physical sub regions and recombined to virtual regions. Therefore, even though physical sub regions belongs to the same $P_X$, virtual regions to which the physical sub regions belong may be different from each other, for example, $V_{Y1}$ and $V_{Y2}$. For example, $(f_{0,2})$ corresponding to a field $(P_0, V_2)$ of the fault information management table indicates the number of faults which are not repaired among fault cells having an address of a physical region 0 and a virtual region 2. Further, $(f_{X,Y})$ has the same value as the number of faults at first, but the value of $(f_{X,Y})$ is reduced during the process of repairing the fault by allocating a spare cell.

Further, $R_X$ indicates the number of spare rows available in an X-th physical region and $C_Y$ indicates the number of spare columns available in a Y-th virtual region. Further, in the physical region, the fault cell in which a fault is generated is replaced with a spare row, so that the repair is performed. Further, in the virtual region, the fault cell in which a fault is generated is replaced with a spare column, so that the repair is performed.

Further, $A_Y$ indicates the number of columns (or fault columns) in the Y-th virtual region which has faults which are not repaired. When one column has only one fault, a value of $A_Y$ is the same as the value of $$\sum_{i=0}^{M-1} f_{i,Y}.$$

Further, when several faults are present in one column, even though the number of faults is several, the number of columns having a fault is one. Therefore, a value of $A_Y$ may be equal to or smaller than $$\sum_{i=0}^{M-1} f_{i,Y}.$$

Further, a value of $A_Y$ which is the number of fault columns is used to select a row to be repaired or determine an ending condition of the entire process while comparing with the number of spare columns.

Further, the fault information management table provides information required to perform the entire processes in the memory management system 10 which is divided into the physical region and the virtual region. Further, the analyzing device 200 selects a virtual region $V_Q$ in which a difference $A_Y-C_Y$, which is difference between $A_Y$, which is the number of columns having unrepaired fault in each of the virtual regions included in the fault information management table, and $C_Y$, which is the number of spare columns available in each of the virtual regions included in the fault information management table, has a maximum value. Here, Q may be a value of a virtual region in which a difference between the number of columns having a fault and the number of spare columns has a maximum value.

That is, the analyzing device 200 searches (or selects/checks) a virtual region $V_Q$ in which the difference value $A_Y-C_Y$, which is difference between $A_Y$, which is the number of columns having unrepaired fault in each of the virtual regions, and $C_Y$, which is the number of spare columns available in each of the virtual regions, has a maximum value, for all virtual regions.

Further, the analyzing device 200 checks whether $A_Q$, which is the number of columns having unrepaired faults in the selected virtual region $V_Q$, is equal to or smaller than the $C_Q$, which is the number of available spare columns in the selected virtual region $V_Q$.

As the checking result, when $A_Q$, which is the number of columns having unrepaired faults in the selected virtual region $V_Q$, is equal to or smaller than the $C_Q$, which is the number of available spare columns in the selected virtual region $V_Q$, the analyzing device 200 checks that the fault repair is successfully completed. Further, the analyzing device 200 stores, at a fault repair completion time, position information of K bits related with the virtual region, position information of M+N−K bits related with the virtual region, and a fault address according to an allocation result of the spare cell in a fault address storage space which is managed by the physical region and the virtual region in the storage medium 100 corresponding to the virtual region and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

Further, as the checking result, when $A_Q$, which is the number of columns having unrepaired faults in the selected virtual region $V_Q$, is larger than $C_Q$, which is the number of available spare columns in the selected virtual region $V_Q$, the analyzing device 200 determines that the repair is unable only by the spare column. Therefore, in order to perform the repair using the spare row, the analyzing device 200 determines whether there is $R_X$, which is the number of spare rows available in each of the physical regions and set in advance for all of the physical region $P_X$, which is larger than 0 in the virtual region $V_Q$.

As the determining result, when there is no $R_X$, which is the number of spare rows available in each of the physical regions which is larger than 0 which is set in advance, for all of the physical regions $P_X$, the analyzing device 200 determines that the fault repair fails and ends the entire processes Further, as the determining result, when there is $R_X$, which is the number of spare rows available in each of the physical regions and set in advance, which is larger than 0, for all of the physical regions $P_X$ of the virtual region $V_Q$, the analyzing device 200 selects one physical region $P_A$ in which $(P_X, V_Q)$ has a fault and $R_X$, which is the number of spare rows available in the physical region, has maximum value, for all physical region $P_X$ of the virtual region $V_Q$ (or for the virtual region $V_Q$). Here, $P_A$ is one of the physical regions $P_X$ and $(P_A, V_Q)$ represents cells, which are defined by $P_X$ and $V_Q$, of the fault information management table.

Further, the analyzing device 200 checks a row in which $A_Q$, which is the number of columns having unrepaired faults in the selected virtual region $V_Q$, is reduced at the most in $(P_A, V_Q)$ corresponding to the selected physical region $P_A$. Here, $(P_A, V_Q)$ represents a cell, which is defined by $P_A$ and $V_Q$, of the fault information management table.

Further, the analyzing device 200 reduces a value of $(f_{A,Q})$ of $(P_A, V_Q)$ corresponding to the selected physical region $P_A$ as many as the number of faults which may be repaired by the spare row, which is a first number. Here, $(P_A, V_Q)$ represents a cell, which is defined by $P_A$ and $V_Q$, of the fault information management table and $(f_{A,Q})$ is the number of the unrepaired faults stored in the cell defined by $P_A$ and $V_Q$. Further, the analyzing device 200 reduces $A_Q$, which is the number of columns corresponding to the selected physical region $P_A$ which are not repaired and have faults, as many as the number of columns which may be repaired by the spare row so that the fault repair is not necessary, which is a second number. Further, the analyzing device 200 reduces $R_A$, which is the number of available spare rows, as many as the number of used spare rows which is a third number.

Further, the analyzing device 200 returns to a process of selecting the virtual region $V_Q$ in which $A_Y-C_Y$, which is the difference between $A_Y$, which is the number of columns having unrepaired fault in each of the virtual regions included in the fault information management table, and $C_Y$, which is the number of spare columns which are available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of spare columns available in the virtual region $V_Q$.

If a value of $A_Y$ of a virtual region $V_Y$ in which there is no left spare row and $(A_Y-C_Y)$ has a maximum value exceeds a value of $C_Y$, the analyzing device 200 determines that fault repair fails and ends the entire processes.

As described above, the analyzing device 200 may perform a memory management function on a column-first basis (or based on a column-first algorithm).

Further, when a row-first based (or a row-first algorithm based) memory management function is performed, the analyzing device 200 performs the memory management function by changing the orders of above-described processes.

That is, the analyzing device 200 determines whether there is $R_X$, which is the number of spare rows available in each of the physical regions and set in advance, which is larger than 0, for all of the physical regions $P_X$.

As the determining result, when there is no $R_X$, which is the number of spare rows available in each of the physical regions and set in advance, for all physical regions $P_X$, the analyzing device 200 checks whether $A_Y$, which is the number of columns having unrepaired faults in all of the virtual regions, is equal to or smaller than the $C_Y$, which is the number of available spare columns in the virtual region.

As the checking result, when $A_Y$, which is the number of columns having unrepaired fault in all of the virtual regions, is equal to or smaller than $C_Y$, which is the number of spare columns available in all of the virtual regions, the analyzing device 200 confirms that the fault repair is successfully completed. Further, the analyzing device 200 stores position information of K bits related with the virtual region, position information of M+N−K bits related with the virtual region, and a fault address according to an allocation result of the spare cell at a fault repair completion time in a fault address storage space which is managed by the physical region and the virtual region in the storage medium 100 corresponding to the virtual region, and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

Further, as the checking result, when $A_Y$, which is the number of columns having unrepaired fault in all the virtual regions, is larger than $C_Y$, which is the number of available spare columns in the virtual region, the analyzing device 200 determines that the repair is unable only by using the spare rows available in the virtual region $V_Y$ and the fault repair fails and ends the entire processes.

Further, as the determining result, there is $R_X$, which is the number of spare rows available in each of the physical regions and set in advance, which is larger than 0, for all of the physical regions $P_X$ of the virtual region $V_Q$, the analyzing device 200 selects one physical region $P_A$ in which $(P_X, V_Q)$ has a fault and $R_X$, which is the number of spare rows available in the physical region, has maximum value. Here, $P_A$ is one of the physical regions $P_X$ and $(P_A, V_Q)$ represents cells, which are defined by $P_X$ and $V_Q$, of the fault information management table.

Further, the analyzing device 200 checks a row in which $A_Q$, which is the number of columns having unrepaired faults in the selected virtual region $V_Q$, is reduced at the most in $(P_A, V_Q)$ corresponding to the selected physical region $P_A$. Here, $(P_A, V_Q)$ represents a cell, which is defined by $P_A$ and $V_Q$, of the fault information management table.

Further, the analyzing device 200 reduces a value of $(f_{A,Q})$ of $(P_A, V_Q)$ corresponding to the selected physical region $P_A$ as many as the number of faults which may be repaired by the spare row, which is a first number. Here, $(P_A, V_Q)$ represents a cell, which is defined by $P_A$ and $V_Q$, of the fault information management table and $(f_{A,Q})$ is the number of the unrepaired faults stored in the cell defined by $P_A$ and $V_Q$. Further, the analyzing device 200 reduces $A_Q$, which is the number of columns corresponding to the selected physical region $P_A$ which are not repaired and have faults, as many as the number of columns which may be repaired by the spare row so that the fault repair is not necessary, which is a second number. Further, the analyzing device 200 reduces $R_A$, which is the number of available spare rows as many as the number of used spare rows which is a third number.

Further, the analyzing device 200 returns to a process of selecting a virtual region $V_Q$ in which $A_Y-C_Y$, a difference between $A_Y$, which is the number of columns having unrepaired fault in each of the virtual regions included in the fault information management table, and $C_Y$, which is the number of spare columns available in each of the virtual regions included in the fault information management table, has a maximum value to repeatedly perform a process of allocating a spare row until $R_X$, which is the number of spare rows available in each of the physical regions which is larger than 0 which is set in advance becomes 0 (or until there is no spare rows available in each of the physical regions).

As described above, the column-first (or the column-first algorithm) proceeds in a direction which is likely to utilize the spare columns as many as possible and leave the spare rows but the row-first (or the row-first algorithm) proceeds in a direction which is likely to utilize the spare rows as many as possible and leave the spare columns.

Further, when a fast column-first based memory management function is performed, the analyzing device 200 may perform the memory management function by changing the orders of above-described processes and adding some processes.

That is, the analyzing device 200 calculates a difference value $A_Y-C_Y$ between $A_Y$ which is the number of columns having unrepaired faults in each of the virtual regions $C_Y$ which is the number of spare columns available in each of the virtual regions.

Further, the analyzing device 200 sorts the calculated differences value $A_Y-C_Y$. In this case, a sorting method may be a descending order or an ascending order.

That is, the analyzing device 200 sorts the calculated difference value $A_Y-C_Y$ and the virtual regions $V_Y$ corresponding to the calculated difference value $A_Y-C_Y$ based on the calculated difference value $A_Y-C_Y$.

Further, the analyzing device 200 selects a virtual region $V_D$ where the fault is not repaired in the sorted order. Here, D may be a value obtained by sorting virtual regions in a descending order using a difference value between the number of columns having faults and the number of spare columns and selecting virtual regions in which the faults are not repaired in the sorted order.

Further, the analyzing device 200 primarily checks whether $A_D$, which is the number of columns having unrepaired fault in the selected virtual region $V_D$, is equal to or smaller than $C_D$, which is the number of spare columns available in the virtual region $V_D$.

Further, as the primarily checking result, when $A_D$ is larger than the $C_D$, as the primarily checking result, the analyzing device 200 determines that the repair is unable only by the spare column and in order to perform the repair using the spare row, the analyzing device 200 determines whether there is $R_X$ which is larger than 0 in the virtual region $V_D$, for all physical regions $P_X$. Here, $R_X$ is the number of spare rows available in each of the physical regions and set in advance for all of the physical regions $P_X$.

As the determining result, when there is no $R_X$, which is the number of spare rows available in each of the physical regions and set in advance, which is larger than 0, for all physical regions $P_X$, the analyzing device 200 determines that the fault repair fails and ends the entire processes Further, as the determining result, when there is $R_X$, which is the number of spare rows available in each of the physical regions and set in advance, which is larger than 0, for all physical regions $P_X$ of the virtual region $V_D$, the analyzing device 200 selects one physical region $P_A$ in which $(P_X, V_D)$ has a fault and $R_X$, which is the number of spare rows available in the physical region, has maximum value. Here, $P_A$ is one of the physical regions $P_X$ and $(P_X, V_D)$ represents cells, which are defined by $P_X$ and $V_D$, of the fault information management table.

Further, the analyzing device 200 checks a row in which $A_D$, which is the number of columns having unrepaired faults in the selected virtual region $V_D$ is reduced at the most in $(P_A, V_D)$ corresponding to the selected physical region $P_A$. Here, $(P_A, V_D)$ represents a cell, which is defined by $P_A$ and $V_Q$, of the fault information management table.

Further, the analyzing device 200 reduces a value of $(f_{A,D})$ of $(P_A, V_D)$ corresponding to the selected physical region $P_A$ as many as the number of faults which may be repaired by the spare row, which is a first number. Here, $(P_A, V_D)$ represents a cell, which is defined by $P_A$ and $V_D$, of the fault information management table and $(f_{A,D})$ is the number of the unrepaired faults stored in the cell defined by $P_A$ and $V_D$. Further, the analyzing device 200 reduces $A_D$, which is the number of columns corresponding to the selected physical region $P_A$ which are not repaired and have faults, as many as the number of columns which are repaired by the spare row so that the fault repair is not necessary, which is a second number. Further, the analyzing device 200 reduces $R_A$, which is the number of available spare rows, as many as the number of used spare rows which is a third number.

Further, the analyzing device 200 returns to a process (for example, step S2940) of primarily checking whether $A_D$, which is the number of columns having unrepaired faults in the selected virtual region $V_D$, is equal to or smaller than $C_D$, which is the number of spare columns available in the virtual region $V_D$ to repeatedly perform a process of allocating the spare row to the selected virtual region $V_D$ until $A_D$, which is the number of columns having unrepaired faults in the selected virtual region $V_D$, is equal to or smaller than $C_Y$, which is the number of spare columns available in all of the virtual regions $V_Y$.

Further, as the primarily checking result, when $A_D$, which is the number of columns having unrepaired fault in the selected virtual region $V_D$, is equal to or smaller than $C_D$, which is the number of spare columns available in the virtual region $V_D$, the analyzing device 200 secondarily checks whether $A_Y$, which is the number of columns having unrepaired fault in all of the virtual regions $V_Y$, is equal to or smaller than $C_Y$, which is the number of spare columns available in all of the virtual regions $V_Y$.

As the secondarily checking result, when $A_Y$, which is the number of columns having unrepaired fault in all of the virtual regions $V_Y$, is equal to or smaller than $C_Y$, which is the number of spare columns available in all of the virtual regions $V_Y$, the analyzing device 200 confirms that the fault repair is successfully completed. Further, the analyzing device 200 stores position information of K bits related with the virtual region, position information of M+N−K bits related with the virtual region, and a fault address according to an allocation result of the spare cell at a fault repair completion time in a fault address storage space which is managed by the physical region and the virtual region in the storage medium 100 corresponding to the virtual region, and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

Further, as the secondarily checking result, when $A_Y$, which is the number of columns having unrepaired fault in all of the virtual regions $V_Y$, is not equal to or smaller than $C_Y$, which is the number of spare columns available in all of the virtual regions $V_Y$ (or when there is at least one $A_Y$, which is the number of columns having unrepaired fault, which is larger than $C_Y$, which is the number of spare columns available in all of the virtual regions $V_Y$), the analyzing device 200 returns to a process of selecting a next virtual region (or a new virtual region) $V_D$ in which the fault is not repaired among all the sorted virtual regions $V_Y$.

That is, after repeatedly performing the process until $A_Y$, which is the number of columns having unrepaired faults in the selected virtual region $V_D$, becomes equal to or smaller than $C_Y$, which is the number of spare columns available in all of the virtual regions $V_Y$, the analyzing device 200 selects a new virtual region $V_D$. Further, the analyzing device 200 repeatedly performs a process of primarily checking whether $A_D$, which is the number of the columns having unrepaired faults in the selected new virtual region $V_D$, is equal to or smaller than $C_D$, which is the number of spare columns available in the corresponding new virtual region $V_D$ and a process of allocating the spare rows to the selected new virtual region $V_D$ until $A_D$, which is the number of the columns having unrepaired faults in the selected new virtual region $V_D$, becomes equal to or smaller than $C_D$, which is the number of spare columns available in the virtual region $V_D$.

As described above, the analyzing device 200 may perform a spare column allocating process on all the virtual regions $V_Y$ through a spare row allocating process on a column in the selected virtual region $V_D$ which is not repaired and has a fault.

When there is no left (or available) spare row and a value of $A_Y$ of the virtual region $V_Q$ is larger than a value of $C_Y$ of the virtual region $V_Q$, the analyzing device 200 determines that the fault repair fails and ends the entire processes. Here, $A_Y$ is the number of columns having unrepaired fault in each of the virtual regions, $C_Y$ is the number of spare columns available in each of the virtual regions and $V_Q$ is the virtual region in which the difference between $A_Y$ and $C_Y$ has the maximum value.

When a fast row-first based memory management function is performed, the analyzing device 200 performs the memory management function by changing the orders of above-described processes and adding some processes.

That is, the analyzing device 200 calculates respectively $A_Y$–$C_Y$, which is the difference between $A_Y$, which is the number of columns having unrepaired faults in each virtual region and $C_Y$, which is the number of spare columns available in each virtual region.

Further, the analyzing device 200 sorts the calculated difference values $A_Y$–$C_Y$. In this case, the sorting method may be a descending order or an ascending order.

That is, the analyzing device 200 sorts the calculated difference value $A_Y$–$C_Y$ and the virtual regions $V_Y$ corresponding to the calculated difference value $A_Y$–$C_Y$ based on the calculated difference value $A_Y$–$C_Y$.

Further, the analyzing device 200 selects a virtual region $V_D$ where the fault is not repaired, in the sorted order. Here, D may be a value obtained by sorting virtual regions in a descending order using a difference value between the number of columns having faults and the number of spare columns and selecting virtual regions in which the faults are not repaired in the sorted order.

Further, the analyzing device 200 primarily checks whether $A_D$, which is the number of the columns having unrepaired faults in the selected virtual region $V_D$, is equal to or smaller than $C_D$, which is the number of spare columns available in the virtual region $V_D$.

Further, as the primarily checking result, when $A_D$, which is the number of the columns having unrepaired faults, in the selected virtual region $V_D$ is larger than $C_D$, which is the number of spare columns available in the virtual region $V_D$, the analyzing device 200 determines that the repair is unable only by the spare column. Therefore, in order to perform the repair using the spare row, the analyzing device 200 determines whether there is $R_X$, which is the number of spare rows available in each physical region and set in advance, which is larger than 0 in the virtual region $V_D$, for all physical regions $P_X$. As the determining result, when there is no $R_X$, which is the number of spare rows available in each of the physical regions and set in advance, which is larger than 0 which is set in advance, for all physical regions $P_X$, the analyzing device 200 determines that the fault repair fails and ends the entire processes.

Further, as the determining result, when there is $R_X$, which is the number of spare rows available in each of the physical regions and set in advance, which is larger than 0, for all of the physical regions $P_X$, the analyzing device 200 selects one physical region $P_A$ in which ($P_X$, $V_D$) has a fault and $R_X$, which is the number of spare rows available in the physical region, has maximum value. Here, $P_A$ is one of the physical regions $P_X$ and ($P_X$, $V_D$) represents cells, which are defined by $P_X$ and $V_D$, of the fault information management table.

Further, the analyzing device 200 checks a row in which $A_D$, which is the number of columns having unrepaired faults in the selected virtual region $V_D$ is reduced at the most in ($P_A$, $V_D$) corresponding to the selected physical region $P_A$.

Here, $(P_A, V_D)$ represents a cell, which is defined by $P_A$ and $V_Q$, of the fault information management table.

Further, the analyzing device 200 reduces a value of $(f_{A,D})$ of $(P_A, V_D)$ corresponding to the selected physical region $P_A$ as many as the number of faults which are repaired by the spare row, which is a first number. Here, $(P_A, V_D)$ represents a cell, which is defined by $P_A$ and $V_D$, of the fault information management table and $(f_{A,D})$ is the number of the unrepaired faults stored in the cell defined by $P_A$ and $V_D$. Further, the analyzing device 200 reduces $A_D$, which is the number of columns corresponding to the selected physical region $P_A$ which are not repaired and have faults, as many as the number of columns which are repaired by the spare row so that the fault repair is not necessary, which is a second number. Further, the analyzing device 200 reduces $R_A$, which is the number of available spare rows, as many as the number of used spare rows which is a third number.

Further, the analyzing device 200 returns to a process (for example, step S4740) of primarily checking whether $A_D$ which is the number of columns having unrepaired fault in the selected virtual region $V_D$, is equal to or smaller than $C_D$, which is the number of spare columns available in the virtual region $V_D$ to repeatedly perform a process of allocating the spare row to the selected virtual region $V_D$ until $A_D$, which is the number of columns having unrepaired faults in the selected virtual region $V_D$, is equal to or smaller than $C_D$, which is the number of spare columns available in the selected virtual region $V_D$.

Further, as the primarily checking result, when $A_D$, which is the number of columns having unrepaired fault in the selected virtual region $V_D$, is equal to or smaller than $C_D$, which is the number of spare columns available in the virtual region $V_D$, the analyzing device 200 secondarily checks whether $A_Y$, which is the number of columns having unrepaired fault in all of the virtual regions $V_Y$, is equal to or smaller than $C_Y$, which is the number of spare columns available in all of the virtual regions $V_Y$.

Further, as the secondarily checking result, when $A_Y$, which is the number of columns having unrepaired fault in all of the virtual regions $V_Y$, is equal to or smaller than $C_Y$, which is the number of spare columns available in all of the virtual regions $V_Y$, the analyzing device 200 secondarily determines whether there is $R_X$, which is the number of spare rows available in each of the physical regions and set in advance, which is larger than 0, for all physical regions $P_X$.

As the secondarily determining result, when there is $R_X$, which is the number of spare rows available in each of the physical regions and set in advance, which is larger than 0, for all of the physical regions $P_X$ in the virtual region $V_D$, the analyzing device 200 selects a next virtual region $V_D$ in which the fault is not repaired in the sorted order. Here, D may be a value obtained by sorting virtual regions in a descending order using a difference value between the number of columns having faults and the number of spare columns and selecting virtual regions in which the faults are not repaired in the sorted order.

Further, for the newly selected next virtual region, the analyzing device 200 returns to a process of selecting one physical region $P_A$ in which $(P_X, V_D)$ has a fault and the number of spare rows available in the physical region is maximum for all physical regions $P_X$ of the corresponding next virtual region (or the virtual region $V_D$) and checking a row in which $A_Q$, which is the number of columns having unrepaired faults in the selected virtual region $V_Q$, is reduced as many as possible in $(P_A, V_Q)$ corresponding to the selected physical region $P_A$. Here, $(P_X, V_D)$ represents cells, which are defined by $P_X$ and $V_D$. $(P_A, V_Q)$ represents cells, which are defined by $P_A$ and $V_Q$.

Further, as the secondarily determining result, when there is no $R_X$, which is the number of spare rows available in each of the physical regions and set in advance, which is larger than 0 which is set in advance, for all physical regions $P_X$, in the virtual region $V_D$, the analyzing device 200 determines that the fault repair is successfully completed, stores position information of K bits related with the virtual region, position information of M+N−K bits related with the virtual region, and a fault address according to an allocation result of the spare cell at a fault repair completion time in a fault address storage space which is managed by the physical region and the virtual region in the storage medium 100 corresponding to the virtual region, and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

Further, as the secondarily checking result, when $A_Y$, which is the number of columns having unrepaired fault in all of the virtual regions $V_Y$, is larger than $C_Y$, which is the number of spare columns available in all of the virtual regions $V_Y$, (or when there is at least one of the number $A_Y$ of columns which are not repaired and have faults which is larger than the number $C_Y$ of spare columns available in all the virtual regions $V_Y$), the analyzing device 200 returns to a process of selecting a virtual region $V_D$ in which the fault is not repaired among all the sorted virtual regions $V_Y$.

Further, after repeatedly performing the process until $A_Y$, which is the number of columns having unrepaired faults in the selected virtual region $V_D$, becomes equal to or smaller than $C_Y$, which is the number of spare columns available in all the virtual regions $V_Y$, the analyzing device 200 selects a new virtual region $V_D$. Further, the analyzing device 200 repeatedly performs a process of primarily checking whether $A_D$, which is the number of the columns having unrepaired faults in the selected new virtual region $V_D$, is equal to or smaller than $C_D$, which is the number of spare columns available in the corresponding new virtual region $V_D$ for the selected new virtual region $V_D$ and a process of allocating the spare rows to the selected new virtual region $V_D$ until $A_D$, which is the number of the columns having unrepaired faults in the selected new virtual region $V_D$, becomes equal to or smaller than $C_D$, which is the number of spare columns available in the virtual region $V_D$.

As described above, the analyzing device 200 may perform a spare column allocating process on all the virtual regions $V_Y$ through a spare row allocating process on a column in the selected virtual region $V_D$ which is not repaired and has a fault.

When there is no left (or available) spare row and a value of $A_Y$ of the virtual region $V_Y$ in which $A_Y$−$C_Y$, which is difference between $A_Y$ which is the number of columns having unrepaired faults in each virtual region and $C_Y$ which is the number of spare columns available in each virtual region, has a maximum value exceeds a value of $C_Y$, the analyzing device 200 determines that the fault repair fails and ends the entire processes. Here, $C_Y$ is the number of spare columns available in each of the virtual regions and $V_Q$ is the virtual region in which the difference between $A_Y$ and $C_Y$ has the maximum value Further, the column-first algorithm, the row-first algorithm, the fast column-first algorithm, and the fast row-first algorithm are selectively used in accordance with the selection of a designer according to an environment and a purpose of each memory system (not illustrated) during a memory manufacturing process.

As described above, restricted spare cells may be optimally distributed (or allocated) to a physical region and a virtual region in a system for repairing a fault of a memory.

Further, as described above, a sub array serves as a physical region of the unit region and virtual regions obtained by recombining the sub arrays are optimally distributed to separate spare cells to maximize fault repair.

Further, as described above, it is possible to provide allocation of spare cells which simultaneously satisfy not only a designed target value of a virtual region but also a designed target value of a physical region and store a fault address in a fault address storage space which is managed by K bit position information at an allocation time, M+N−K bit position information, and a physical region and a virtual region in a corresponding storage medium according to an allocating result of the spare cell.

Further, as described above, after repeatedly performing a repair on a virtual region selected by a fast column-first algorithm and a fast row-first algorithm using a column or a row, a repair may be performed on a next virtual region.

Hereinafter, a memory management method will be described in detail with reference to FIGS. 1 to 47.

Figure 10:
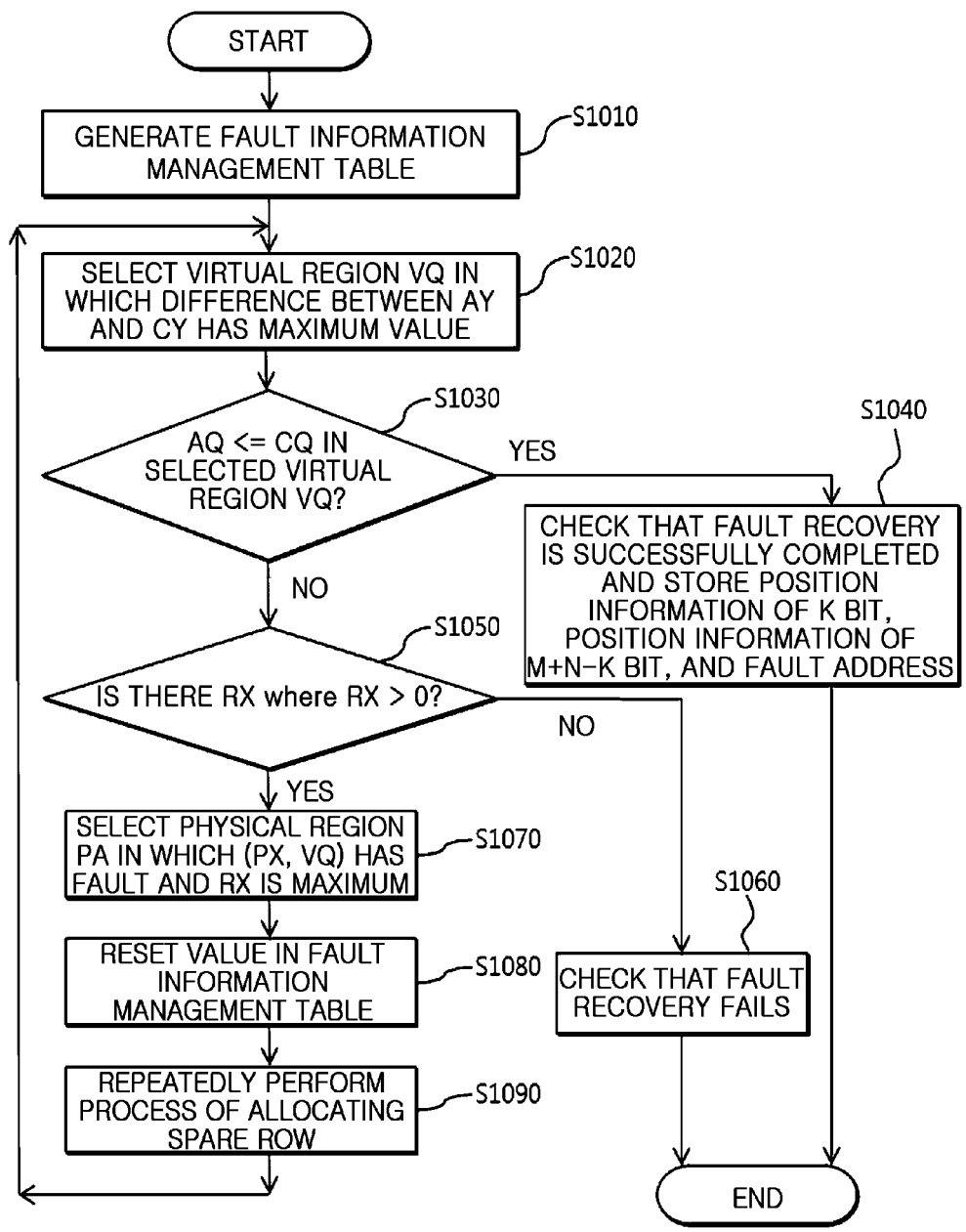
FIG. 10 is a flowchart illustrating a column-first based memory management method.

FIG. 10 is a flowchart illustrating a column-first based memory management method.

First, the analyzing device 200 generates a fault information management table representing a relationship of ($f_{X,Y}$) which is the number of faults, $R_X$ which is the number of spare rows available in each of the physical regions, $C_Y$ which is the number of spare columns available in each of the virtual regions, and $A_Y$ which is the number of columns having unrepaired faults in each of the virtual regions, for a physical region (or a physical basic region $P_X$) and a virtual region (or a virtual basic region $V_Y$). In this case, X denotes a physical region and Y denotes a virtual region.

Here, the virtual region may be one of all combinations which are configurable by the analyzing device 200 where the analyzing device 200 divides each of the physical basic regions into two physical sub regions having same size and combines the physical sub regions into the virtual basic regions.

Further, the analyzing device 200 checks whether all configurable combinations satisfy a target value which is set in advance by the memory management method. In this case, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) which is same with the number of available (or available in the memory system) spare cells which are provided in the memory cell. That is, the target value may be a number of same resources which may be available in all physical basic regions which map to a predetermined value corresponding to the information to be stored. Further, in the case of a memory system which avoids a fault memory block, the target value may be a number of same memory blocks which are available in all physical basic regions of the memory system.

Further, when the number of information to be stored in the combined virtual basic region satisfies a predetermined target value, the analyzing device 200 stores the position information of K bits related with the virtual basic region which satisfies the target value and the position information of M+N−K bits related with the virtual sub region which satisfies the target value in a predetermined (or previously allocated) storage region in the storage medium 100, among the M+N bits. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region. Here, M represents a number of physical regions, N represents a number of virtual regions, and M, N, and K are natural numbers. Further, the size of K may be a bit rate to approach the information storage table 110.

As an example, as illustrated in FIG. 11, when it is assumed that one row or column does not have several faults (or one row or column have only one fault), the analyzing device 200 divides the physical regions (or the subarray) of the storage medium 100 into a plurality of physical sub regions and combines (or recombines) the physical sub regions to generate virtual basic regions and virtual sub regions. In this case, physical sub regions with the same number are recombined to generate virtual regions, but the present solution is not limited thereto. As described in FIG. 1 and the related detailed description, the virtual region may be generated by combining physical sub regions which satisfy the target value. Here, physical sub regions No. 0 of each physical region are recombined into virtual regions No. 0 (for example, yellow), physical sub regions No. 1 of each physical region are recombined into virtual regions No. 1 (for example, blue), physical sub regions No. 2 of each physical region are recombined into virtual regions No. 2 (for example, green), and physical sub regions No. 3 of each physical region are recombined into virtual regions No. 3 (for example, red). Further, the physical region performs fault repair using a spare row and the recombined virtual region performs fault repair using a spare column.

Each physical region is set to use four or three spare rows and the virtual region is set to use seven or eight spare columns. In this case, the number of spare cells varies because fault may be generated even in the spare row region and the spare column region during a memory manufacturing process and thus all spare cells inserted at the time of design may not be used in a specific region. Further, the number of specific spare cells is set to vary in order to exhibit that an optimal fault repairing method is found to be operated even when the above-described problem is caused.

Further, as illustrated in FIG. 12, the analyzing device 200 generates a fault information management table representing a relationship of the physical regions (for example, $P_0$ to $P_3$), the virtual regions (for example, $V_0$ to $V_3$), the number of faults (for example, $f_{0,0}$ to $f_{3,3}$) related with the physical region and the virtual region according to a position where a fault cell is generated, the number (for example, $R_0$ to $R_3$) of spare rows available in each physical region, the number (for example, $C_0$ to $C_3$) of spare columns available in each virtual region, and the number (for example, $A_0$ to $A_3$) of columns in each virtual region which are not repaired and have faults. Further, as illustrated in FIG. 12, it is set that three spare rows are available in $P_3$, four spare rows are available in remaining physical regions, seven spare columns are available in $V_1$, and eight spare columns are available in remaining virtual regions, according to an exemplified target value (S1010).

Thereafter, the analyzing device 200 selects a virtual region $V_Q$ in which $A_Y$–$C_Y$, which is difference between $A_Y$, which is the number of columns having unrepaired faults in the virtual region, and $C_Y$, which is the number of spare columns available in each virtual region, has a maximum value. Here, Q may be a value of a virtual region in which a difference between the number of columns having a fault and the number of spare columns has a maximum value.

That is, the analyzing device 200 searches (or selects/checks) a virtual region $V_Q$ in which $A_Y$–$C_Y$ which is the difference between $A_Y$ which is the number of columns having unrepaired faults in the virtual region and $C_Y$ which is the number of spare columns available in each virtual region has a maximum value, for all virtual regions.

For example, as illustrated in FIG. 12, the analyzing device 200 calculates $A_0$–$C_0$ (15–8=7), $A_1$–$C_1$ (8–7=1), $A_2$–$C_2$ (15–8=7), and $A_3$–$C_3$ (8–8=0) for all virtual regions (for example, $V_0$ to $V_3$), checks virtual regions $V_0$ and $V_2$ having the maximum value among the calculated $A_0$–$C_0$ (15–8=7), $A_1$–$C_1$ (8–7=1), $A_2$–$C_2$ (15–8=7) and $A_3$–$C_3$ (8–8=0), and selects $V_0$ as any one between the checked virtual regions $V_0$ and $V_2$ having the maximum value (S1020).

Thereafter, the analyzing device 200 checks whether $A_Q$ which is the number of columns having unrepaired faults in the selected virtual region $V_Q$ is equal to or smaller than $C_Q$ which is the number of spare columns available in the virtual region $V_Q$.

For example, as illustrated in FIG. 12, the analyzing device 200 checks whether $A_0$ (for example, 15) which is the number of the columns having unrepaired faults in the selected virtual region $V_0$ is equal to or smaller than $C_0$ (for example, 8) which is the number of spare columns available in the selected virtual region $V_0$ (S1030).

As the checking result, when $A_Q$ which is the number of columns having unrepaired faults in the selected virtual region $V_Q$ is equal to or smaller than $C_Q$ which is the number of spare columns available in the virtual region $V_Q$, the analyzing device 200 checks that the fault repair is successfully completed. Further, the analyzing device 200 stores, at a fault repair completion time, position information of K bits related with the virtual region, position information of M+N−K bits related with the virtual region, and a fault address according to an allocation result of the spare cell in a fault address storage space which is managed by the physical region and the virtual region in the storage medium 100 corresponding to the virtual region and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

For example, when $A_0$ (for example, 8) which is the number of the columns having unrepaired faults in the selected virtual region $V_0$ is equal with $C_0$ (for example, 8) which is the number of spare columns available in the selected virtual region $V_0$, the analyzing device 200 checks that the fault repair is successfully completed, stores position information of K bits related with the virtual region $V_0$, position information of M+N−K bits related with the virtual region $V_0$, and a fault address according to an allocation result of the spare cell in a fault address storage space which is managed by the physical region and the virtual region in the storage medium 100 corresponding to the virtual region $V_0$ and ends the fault repair process (S1040).

Further, as the checking result, when $A_Q$ which is the number of columns having unrepaired faults in the selected virtual region $V_Q$ is larger than $C_Q$ which is the number of spare columns available in the virtual region $V_Q$, the analyzing device 200 determines that the repair is unable only by the spare column. Therefore, in order to perform the recover using the spare column, the analyzing device 200 determines whether there is $R_X$, which is the number of spare rows available in each of the physical regions and set in advance, which is larger than 0, for all physical regions $P_X$.

For example, as illustrated in FIG. 12, when $A_0$ (for example, 15) which is the number of columns having unrepaired faults in the selected virtual region $V_0$ is larger than $C_0$ (for example, 8) which is the number of spare columns available in the selected virtual region $V_0$, the analyzing device 200 determines whether there is $R_X$, which is the number of spare rows available in each of physical regions and set in advance, which is larger than 0, for all physical regions $P_X$ (S1050).

As the determining result, when there is no $R_X$, which is the number of spare rows available in each physical region and set in advance, which is larger than 0, for all physical regions $P_X$, the analyzing device 200 determines that the fault repair fails and ends the entire process.

For example, when there is no $R_X$, which is the number of spare rows available in each physical region and set in advance, which is larger than 0, for all physical regions $P_X$, the analyzing device 200 determines that the fault repair fails and ends the entire fault repair process (S1060).

Further, as the determining result, when there is $R_X$, which is the number of spare rows available in each of the physical regions and set in advance, which is larger than 0, for all physical regions $P_X$, the analyzing device 200 selects one physical region $P_A$ in which ($P_X$, $V_Q$) has a fault and $R_X$ which is the number of spare rows available in the physical region is maximum for all physical region $P_X$ of the virtual region $V_Q$ (or for the virtual region $V_Q$). Here, ($P_X$, $V_Q$) represents cells, which are defined by $P_X$ and $V_Q$, of the fault information management table.

Further, the analyzing device 200 checks a row in which $A_Q$ which is the number of columns having unrepaired faults in the selected virtual region $V_Q$ is reduced as many as possible in ($P_A$, $V_Q$) corresponding to the selected physical region $P_A$. Here, ($P_A$, $V_Q$) represents cells which are defined by $P_A$ and $V_Q$.

For example, when there is $R_X$, which is the number of spare rows available in each physical region and set in advance, which is larger than 0, for all physical regions $P_X$, as illustrated in FIG. 12, the analyzing device 200 searches for a plurality of physical regions (for example, $P_0$, $P_1$, and $P_2$) in the virtual region $V_0$ which has a fault (for example, $f_{X,0} \ne 0$) and a maximum value of $R_X$ (for example, 4) which is the number of spare rows available in the physical region. Thereafter, the analyzing device 200 selects any one physical region (for example, $P_0$) among the plurality of searched physical regions (for example, $P_0$, $P_1$, and $P_2$) (S1070).

Thereafter, the analyzing device 200 reduces a value of $(f_{A,Q})$ of $(P_A, V_Q)$ corresponding to the selected physical region $P_A$ as many as the number of faults which may be repaired by the spare row, which is a first number. Here, ($P_A$, $V_Q$) represents cells, which are defined by $P_A$ and $V_Q$, of the fault information management table and $(f_{A,D})$ is the number of the unrepaired faults stored in each of the cells defined by $P_A$ and $V_Q$. Further, the analyzing device 200 reduces $A_Q$ which is the number of the columns having unrepaired faults corresponding to the selected physical region $P_A$ as many as the number of columns which may be repaired by the spare row so that the fault repair is not necessary, which is a second number. Further, the analyzing device 200 reduces $R_A$ which is the number of available spare rows as many as the number of used spare rows which is a third number.

For example, as illustrated in FIG. 13, the analyzing device 200 reduces 4 which is a value of ($f_{0,0}$) of ($P_0$, $V_0$) corresponding to the physical region $P_0$ related with the virtual region $V_0$ by 1 to make 3, reduces 15 which is the number $A_0$ of columns corresponding to ($P_0$, $V_0$) which have faults by 1 to make 14, and reduces 4 which is the number $R_0$ of spare rows corresponding to ($P_0$, $V_0$) by 1 to make 3 (S1080).

Thereafter, the analyzing device 200 returns to a process (for example, step S1020) of selecting a virtual region $V_Q$ in which $A_Y$–$C_Y$, which is the difference between $A_Y$ which is the number of columns having unrepaired faults in each virtual region and $C_Y$ which is the number of spare columns which are available in each virtual region has a maximum value to repeatedly perform a process of allocating a spare row until $A_Q$ which is the number of columns having unrepaired faults in the selected virtual region $V_Q$ is equal to or smaller than $C_Q$ which is the number of spare columns available in the virtual region $V_Q$.

For example, as illustrated in FIGS. 12 to 27, the analyzing device 200 repeatedly performs the process of allocating spare rows to finally generate a fault information management table illustrated in FIG. 27. Here, a value of $A_0$ of the virtual region $V_0$ in which ($A_Y$–$C_Y$) has a maximum value is equal to or smaller than $C_0$ which is the number of available spare columns, so that the repair is successful and the entire spare row allocating process is ended (S1090). Here, $A_Y$–$C_Y$ is the difference between $A_Y$, which is the number of columns having unrepaired faults in each virtual region, and $C_Y$, which is the number of spare columns which are available in each virtual region If a value of $A_Y$ of a virtual region $V_Y$, in which there is no left spare row and ($A_Y$–$C_Y$), has a maximum value exceeds a value of $C_Y$, the analyzing device 200 determines that fault repair fails and ends the entire process.

Further, as a result of performing a column first based memory management method, one fault of ($P_0$, $V_0$) and three faults of ($P_0$, $V_2$) are repaired using all of four spare rows of $P_0$, two faults of ($P_1$, $V_0$), one fault of ($P_1$, $V_1$), and one fault of ($P_1$, $V_2$) are repaired using all of four spare rows of $P_1$, two faults of ($P_2$, $V_0$) and two faults of ($P_2$, $V_2$) are repaired using all of four spare rows of $P_2$, and two faults of ($P_3$, $V_0$) and one fault of ($P_3$, $V_2$) are repaired using all of three spare rows of $P_3$. Further, it is checked that all the left faults may be repaired by the spare columns and the spare cell allocation may be successfully completed by the column-first based memory management method. Here, ($P_0$, $V_0$) represents a cell defined by $P_0$ and $V_0$.

Figure 28:
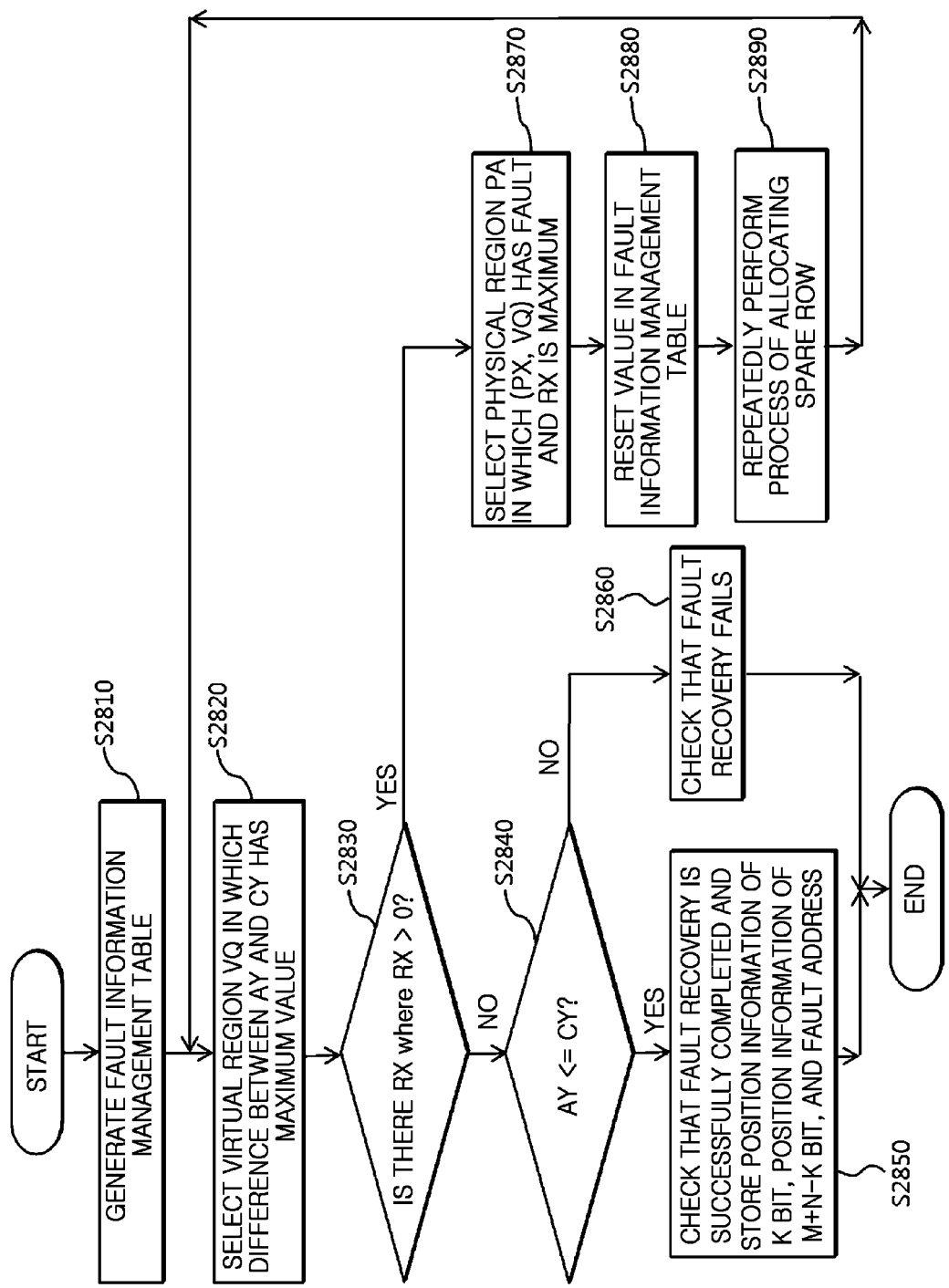
FIG. 28 is a flowchart illustrating a row-first based memory management method.

FIG. 28 is a flowchart illustrating a row-first based memory management method.

First, the analyzing device 200 generates a fault information management table representing a relationship of ($f_{X,Y}$) which is the number of faults, $R_X$ which is the number of spare rows available in each physical region, $C_Y$ which is the number of spare columns available in each virtual region, and $A_Y$ which is the number of columns having unrepaired faults in each virtual region, for a physical region (or a physical basic region $P_X$) and a virtual region (or a virtual basic region $V_Y$).

Here, the virtual region may be one of all combinations which are configurable by the analyzing device 200 where the analyzing device 200 divides each of the physical basic regions into two physical sub regions having same size and combines the physical sub regions into the virtual basic regions.

Further, the analyzing device 200 checks whether all configurable combinations satisfy a target value which is set in advance by the memory management method. In this case, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) of available (or available in the memory system) spare cells which are provided in the memory cell. That is, the target value may be a number of same resources which may be available in all physical basic regions which map to a predetermined value corresponding to the information to be stored. Further, in the case of a memory system which avoids a fault memory block, the target value may be a number of same memory blocks which are available in all physical regions of the memory system.

Further, when the number of information to be stored in the combined virtual basic region satisfies a predetermined target value, the analyzing device 200 stores the position information of K bits related with the virtual basic region which satisfies the target value and the position information of M+N−K bits related with the virtual sub region which satisfies the target value in a predetermined (or previously allocated) storage region in the storage medium 100, among the M+N bits. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region. Here, M represents a number of physical regions, N represents a number of virtual regions, and M, N, and K are natural numbers. Further, the size of K may be a bit rate to approach the information storage table 110 (S2810).

Thereafter, the analyzing device 200 selects a virtual region $V_Q$ in which $A_Y$–$C_Y$ which is the difference between $A_Y$ which is the number of columns having unrepaired faults in the virtual region and $C_Y$ which is the number of spare columns available in each virtual region has a maximum value. Here, Q may be a value of a virtual region in which a difference between the number of columns having a fault and the number of spare columns has a maximum value.

That is, the analyzing device 200 searches (or selects/ checks) a virtual region $V_Q$ in which $A_Y$–$C_Y$ which is the difference between $A_Y$ which is the number of the columns having unrepaired faults and $C_Y$ which is the number of spare columns available in each virtual region has a maximum value, for all virtual regions (S2820).

Thereafter, the analyzing device 200 determines whether there is $R_X$, which is the number of spare rows available in each physical region and set in advance, which is larger than 0, for all physical regions $P_X$ (S2830).

As the determining result, when there is no $R_X$, which is the number of spare rows available in each physical region and set in advance, which is larger than 0, for all physical regions $P_X$, the analyzing device 200 checks whether $A_Y$ which is the number of columns having unrepaired faults in all virtual regions $V_Y$ is equal to or smaller than $C_Y$ which is the number of spare columns available in all the virtual regions $V_Y$ (S2840).

As the checking result, when $A_Y$ which is the number of the columns having unrepaired faults in all the virtual regions $V_Y$ is equal to or smaller than $C_Y$ which is the number of spare columns available in the virtual region $V_Y$, the analyzing device 200 determines that the fault repair is successfully completed. Further, the analyzing device 200 stores, at a fault repair completion time, position information of K bits related with the virtual region $V_Y$, position information of M+N−K bits related with the virtual region, and a fault address according to an allocation result of the spare cell in a fault address storage space which is managed by the physical region and the virtual region in the storage medium 100 corresponding to the virtual region and ends the entire processes. Here, a value of the position information of K bits and a value of the position information of M+N−K bits are configured as vectors and positions of the bits are configured by "0" (or K bits) corresponding to the key value (or a position of K bit) of the virtual basic region and "1" (or M+N−K bits) corresponding to the key value (or a position of M+N−K bits) of the virtual sub region (S2850).

Further, as the checking result, when $A_Y$ which is the number of the columns having unrepaired faults in all the virtual regions $V_Y$ is larger than $C_Y$ which is the number of spare columns available in the virtual region $V_Y$, the analyzing device 200 determines that the repair is unable only by using the available spare columns and the fault repair fails and ends the entire processes (S2860).

Further, as the determining result, when there is $R_X$, which is the number of spare rows available in each physical region and set in advance, which is larger than 0, for all physical regions $P_X$, the analyzing device 200 selects one physical region $P_A$ in which $(P_X, V_Q)$ has a fault and $R_X$ is maximum for all physical region $P_X$ of the virtual region $V_Q$ (or for the virtual region $V_Q$). Here, $(P_X, V_Q)$ represents cells defined by $P_X$ and $V_Q$ and $R_X$ is the number of available spare rows in the physical region.

Further, the analyzing device 200 checks a row in which $A_Q$, which is the number of columns having unrepaired faults in the selected virtual region $V_Q$ and set in advance, is reduced as many as possible in $(P_A, V_Q)$ corresponding to the selected physical region $P_A$ (S2870). Here, $(P_A, V_Q)$ represents cells defined by $P_A$ and $V_Q$.

Thereafter, the analyzing device 200 reduces a value of $(f_{A,Q})$ of $(P_A, V_Q)$ corresponding to the selected physical region $P_A$ as many as the number of faults which may be repaired by the spare row, which is a first number. Here, $(P_A, V_Q)$ represents cells, which are defined by $P_A$ and $V_Q$, of the fault information management table and $(f_{A,Q})$ is the number of the unrepaired faults stored in each of the cells defined by $P_A$ and $V_Q$. Further, the analyzing device 200 reduces $A_Q$ which is the number of the columns having unrepaired faults corresponding to the selected physical region $P_A$ as many as the number of columns which may be repaired by the spare row so that the fault repair is not necessary, which is a second number. Further, the analyzing device 200 reduces $R_A$ which is the number of available spare rows as many as the number of used spare rows which is a third number (S2880).

Thereafter, the analyzing device 200 returns to a process (for example, step S2820) of selecting a virtual region $V_Q$ in which $A_Y-C_Y$ which is the difference between $A_Y$ which is the number of columns having unrepaired faults in each of the virtual regions and $C_Y$ which is the number of spare columns which are available in each virtual region has a maximum value to repeatedly perform a process of allocating a spare row until the number of $R_X$, which is the number of spare rows available in each physical region and set in advance, which is larger than 0 becomes 0 (or until there is no spare rows available in each physical region) (S2890).

Figure 29:
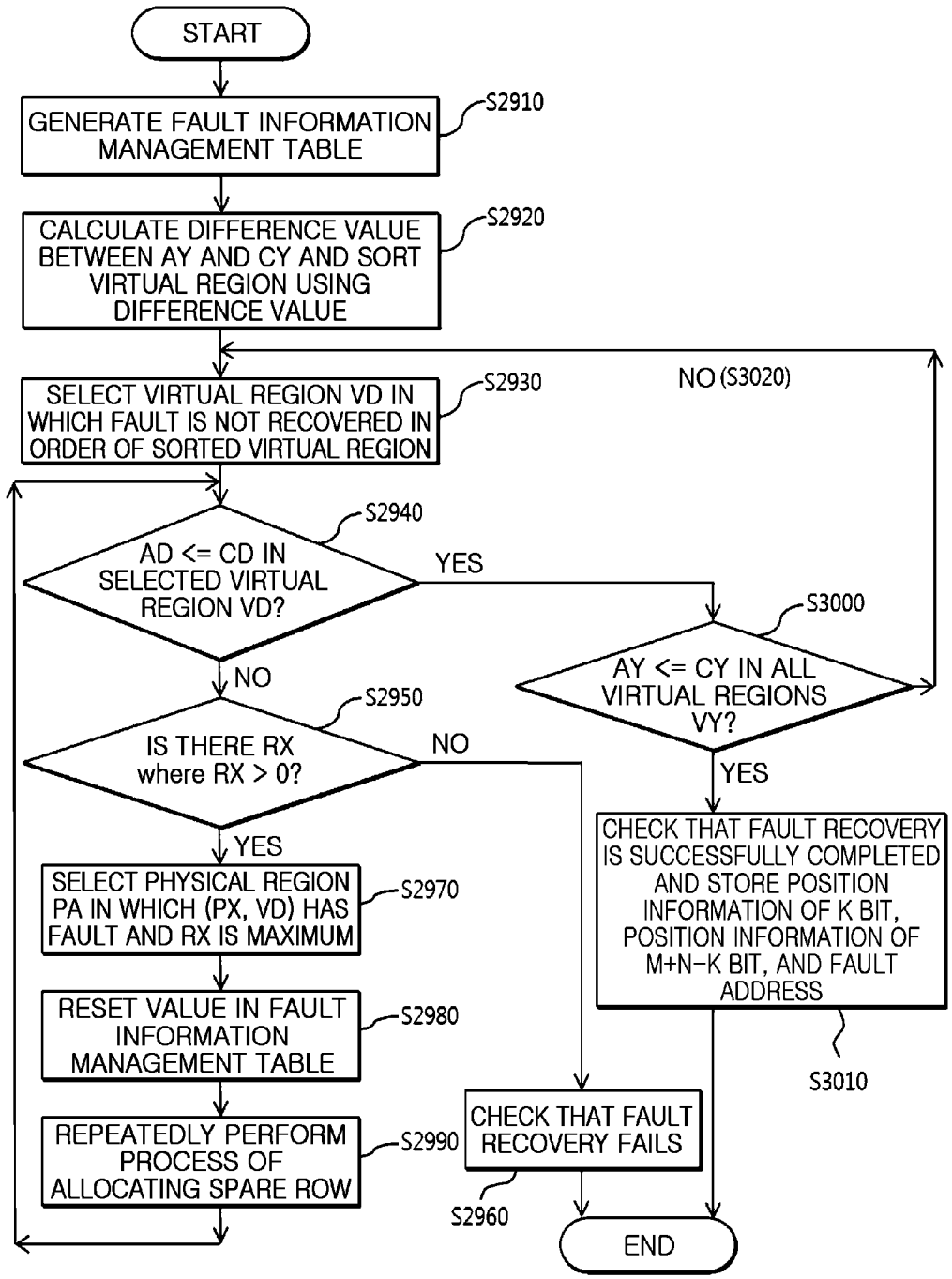
FIG. 29 is a flowchart illustrating a fast column-first based memory management method.

FIG. 29 is a flowchart illustrating a fast column-first based memory management method.

First, the analyzing device 200 generates a fault information management table representing a relationship of $(f_{X,Y})$ which is the number of faults, $R_X$ which is the number of spare rows available in each physical region, $C_Y$ which is the number of spare columns available in each virtual region, and $A_Y$ which is the number of columns having unrepaired faults in each virtual region, for a physical region (or a physical basic region $P_X$) and a virtual region (or a virtual basic region $V_Y$). In this case, X denotes a physical region and Y denotes a virtual region.

Here, the virtual region may be one of all combinations which are configurable by the analyzing device 200 where the analyzing device 200 divides each of the physical basic regions into two physical sub regions having same size and combines the physical sub regions into the virtual basic regions.

Further, the analyzing device 200 checks whether all configurable combinations satisfy a target value which is set in advance by the memory management method. In this case, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) which is same with the number of available (or available in the memory system) spare cells which are provided in the memory cell. That is, the target value may be a number of same resources which may be available in all physical basic regions which map to a predetermined value corresponding to the information to be stored. Further, in the case of a memory system which avoids a fault memory block, the target value may be a number of same memory blocks which are available in all physical basic regions of the memory system.

Further, when the number of information to be stored in the combined virtual basic region satisfies a predetermined target value, the analyzing device 200 stores the position information of K bits related with the virtual basic region which satisfies the target value and the position information of M+N−K bits related with the virtual sub region which satisfies the target value in a predetermined (or previously allocated) storage region in the storage medium 100, among the M+N bits. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region. Here, M represents a number of physical regions, N represents a number of virtual regions, and M, N, and K are natural numbers. Further, the size of K may be a bit rate to approach the information storage table 110.

As an example, as illustrated in FIG. 11, in order to briefly describe the present solution, when it is assumed that one row or column does not have several faults (or one row or column have only one fault), the analyzing device 200 divides the physical regions (or the subarray) of the storage medium 100 into a plurality of physical sub regions and combines (or recombines) the physical sub regions to generate virtual basic regions and virtual sub regions. In this case, in order to briefly describe the present solution, physical sub regions with the same number are recombined to generate virtual regions, but the present solution is not limited thereto. As described in FIG. 1 and the related detailed description, the virtual region may be generated by combining physical sub regions which satisfy the target value. Here, physical sub regions No. 0 of each physical region are recombined into virtual regions No. 0 (for example, yellow), physical sub regions No. 1 of each physical region are recombined into virtual regions No. 1 (for example, blue), physical sub regions No. 2 of each physical region are recombined into virtual regions No. 2 (for example, green), and physical sub regions No. 3 of each physical region are recombined into virtual regions No. 3 (for example, red). Further, the physical region performs fault repair using a spare row and the recombined virtual region performs fault repair using a spare column.

Each physical region is set to use four or three spare rows and the virtual region is set to use seven or eight spare columns. In this case, the number of spare cells varies because fault may be generated even in the spare row region and the spare column region during a memory manufacturing process and thus all spare cells inserted at the time of design may not be used in a specific region. Further, the number of specific spare cells is set to vary in order to exhibit that an optimal fault repairing method is found to be operated even when the above-described problem is caused.

Further, as illustrated in FIG. 31, the analyzing device 200 generates a fault information management table representing a relationship of the physical regions (for example, $P_0$ to $P_3$), the virtual regions (for example, $V_0$ to $V_3$), the number of faults (for example, $f_{0,0}$ to $f_{3,3}$) related with the physical region and the virtual region according to a position where a fault cell is generated, the number (for example, $R_0$ to $R_3$) of spare rows available in each physical region, the number (for example, $C_0$ to $C_3$) of spare columns available in each virtual region, and the number (for example, $A_0$ to $A_3$) of columns having unrepaired faults in each virtual region. Further, as illustrated in FIG. 31, it is set that three spare rows are available in $P_3$, four spare rows are available in remaining physical regions, seven spare columns are available in $V_1$, and eight spare columns are available in remaining virtual regions, according to an exemplified target value (S2910).

Thereafter, the analyzing device 200 calculates respectively $A_Y$–$C_Y$ which is the difference between $A_Y$ which is the number of the columns having unrepaired faults in each virtual region and $C_Y$ which is the number of available spare columns in each virtual region.

Further, the analyzing device 200 sorts the calculated difference values $A_Y$–$C_Y$. In this case, the sorting method may be a descending order or an ascending order.

That is, the analyzing device 200 sorts the calculated difference value $A_Y$–$C_Y$ and the virtual regions $V_Y$ corresponding to the difference value $A_Y$–$C_Y$ based on the calculated difference value $A_Y$–$C_Y$.

For example, as illustrated in FIG. 30, the analyzing device 200 calculates $A_0$–$C_0$ (15–8=7), $A_1$–$C_1$ (8–7=1), $A_2$–$C_2$ (15–8=7), and $A_3$–$C_3$ (8–8=0) for all virtual regions (for example, $V_0$ to $V_3$) and sorts the calculated $A_0$–$C_0$ (15–8=7), $A_1$–$C_1$ (8–7=1), $A_2$–$C_2$ (15–8=7) and $A_3$–$C_3$ (8–8=0) in a descending order (S2920).

Thereafter, the analyzing device 200 selects a virtual region $V_D$ where the fault is not repaired in the sorted order. Here, the D may be a value obtained by sorting virtual regions in a descending order using a difference value between the number of columns having faults and the number of spare columns and selecting virtual regions in which the faults are not repaired in the sorted order.

For example, the analyzing device 200 selects $V_0$ corresponding to $A_0$–$C_0$ (15–8=7) which is the first of virtual regions in which the fault is not repaired, among the difference values ($A_Y$–$C_Y$) for all the virtual regions (for example $V_0$ to $V_3$) illustrated in FIG. 30 (S2930).

Thereafter, the analyzing device 200 primarily checks whether $A_D$ which is the number of the columns having unrepaired faults in the selected virtual region $V_D$ is equal to or smaller than $C_D$ which is the number of spare columns available in the virtual region $V_D$.

For example, as illustrated in FIG. 31, the analyzing device 200 checks whether $A_0$ (for example, 15) which is the number of the columns having unrepaired faults in the selected virtual region $V_0$ is equal to or smaller than $C_0$ (for example, 8) which is the number of spare columns available in the selected virtual region $V_0$ (S2940).

As the primarily checking result, when $A_D$ which is the number of the columns having unrepaired faults in the selected virtual region $V_D$ is larger than $C_D$ which is the number of spare columns available in the virtual region $V_D$, the analyzing device 200 determines that the repair is unable only by the spare column. Therefore, in order to perform the repair using the spare row, the analyzing device 200 determines whether there is $R_X$, which is the number of spare rows available in each physical region and set in advance, which is larger than 0 in the virtual region $V_D$, for all physical regions $P_X$.

For example, as illustrated in FIG. 31, when $A_0$ (for example, 15) which is the number of columns having unrepaired faults in the selected virtual region $V_0$ is larger than $C_0$ (for example, 8) which is the number of spare columns available in the selected virtual region $V_0$, the analyzing device 200 determines whether there is $R_X$, which is the number of spare rows available in each physical region and set in advance, which is larger than 0 in each virtual region, for all physical regions $P_X$ (S2950).

As the determining result, when there is no $R_X$, which is the number of spare rows available in each physical region and set in advance, which is larger than 0, for all physical regions $P_X$, the analyzing device 200 determines that the fault repair fails and ends the entire processes.

For example, when there is no $R_X$, which is the number of spare rows available in each physical region and set in advance, which is larger than 0, for all physical regions $P_X$, the analyzing device 200 determines that the fault repair fails and ends the entire fault repair process (S2960).

Further, as the determining result, when there is $R_X$ which is the number of spare rows available in each physical region and set in advance, which is larger than 0, for all physical regions $P_X$, the analyzing device 200 selects one physical region $P_A$ in which ($P_X$, $V_D$) has a fault and $R_X$ which is the number of spare rows available in the physical region is maximum for all physical region $P_X$ of the virtual region $V_D$ (or for the virtual region $V_D$). Here, ($P_X$, $V_D$) represents cells defined by $P_X$ and $V_D$.

Further, the analyzing device 200 checks a row in which $A_D$ which is the number of columns having unrepaired faults in the selected virtual region $V_D$ is reduced as many as possible in ($P_A$, $V_D$) corresponding to the selected physical region $P_A$.

For example, when there is $R_X$, which is the number of spare rows available in each physical region and set in advance, which is larger than 0, for all physical regions $P_X$, as illustrated in FIG. 31, the analyzing device 200 searches for a plurality of physical regions (for example, $P_0$, $P_1$, and $P_2$) in the virtual region $V_0$ which has a fault (for example, $f_{X,0}$≠0) and a maximum value of $R_X$ (for example, 4) which is the number of spare rows available in the physical region. Thereafter, the analyzing device 200 selects any one physical region (for example, $P_0$) among the plurality of searched physical regions (for example, $P_0$, $P_1$, and $P_2$) (S2970).

Thereafter, the analyzing device 200 reduces a value of $(f_{A,D})$ of $(P_A, V_D)$ corresponding to the selected physical region $P_A$ as many as the number of faults which may be repaired by the spare row, which is a first number. Here, $(P_A, V_D)$ represent a cell, which is defined by $P_A$ and $V_D$, of the fault information management table and $(f_{A,Q})$ is the number of the unrepaired faults stored in the cell defined by $P_A$ and $V_D$. Further, the analyzing device 200 reduces $A_D$ which is the number of the columns having unrepaired faults corresponding to the selected physical region $P_A$ as many as the number of columns which may be repaired by the spare row so that the fault repair is not necessary, which is a second number. Further, the analyzing device 200 reduces $R_A$ which is the number of available spare rows as many as the number of used spare rows which is a third number.

For example, as illustrated in FIG. 32, the analyzing device 200 reduces 4 which is a value of $(f_{0,0})$ of $(P_0, V_0)$ corresponding to the physical region $P_0$ related with the virtual region $V_0$ by 1 to make 3, reduces 15 which is the number $A_0$ of columns corresponding to $(P_0, V_0)$ which have faults by 1 to make 14, and reduces 4 which is the number $R_0$ of spare rows corresponding to $(P_0, V_0)$ by 1 to make 3 (S2980).

Thereafter, the analyzing device 200 returns to a process (for example, step S2940) of primarily checking whether $A_D$, which is the number of columns having unrepaired faults in the selected virtual region $V_D$, is equal to or smaller than $C_D$ which is the number of spare columns available in the virtual region $V_D$ to repeatedly perform a process of allocating the spare row to the selected virtual region $V_D$ until $A_Y$ which is the number of columns having unrepaired faults in the selected virtual region $V_D$ is equal to or smaller than $C_Y$ which is the number of spare columns available in all the virtual regions $V_Y$.

For example, as illustrated in FIGS. 31 to 38, the analyzing device 200 repeatedly performs a process of allocating the spare row to the virtual region $V_0$ so as to satisfy $A_0 \leq C_0$ related with the virtual region $V_0$ (S2990).

Further, as the primarily checking result, when $A_D$ which is the number of columns having unrepaired faults in the selected virtual region $V_D$ is equal to or smaller than $C_D$ which is the number of spare columns available in the virtual region $V_D$ (S2980), the analyzing device 200 secondarily checks whether $A_Y$ which is the number of columns having unrepaired faults in all the virtual regions $V_Y$ is equal to or smaller than $C_Y$ which is the number of spare columns available in all the virtual regions $V_Y$.

For example, when $A_0$ (for example, 8) which is the number of columns having unrepaired faults in the selected virtual region $V_0$ is equal to $C_0$ (for example, 8) which is the number of spare columns available in the selected virtual region $V_0$, the analyzing device 200 secondarily checks whether $A_0$, $A_1$, $A_2$, and $A_3$ which are the numbers of columns having unrepaired faults in all the virtual regions $V_0$ to $V_3$ are equal to or smaller than $C_0$, $C_1$, $C_2$, and $C_3$ which are the numbers of spare columns available in all the virtual regions $V_0$ to $V_3$ (S3000).

As the secondarily checking result, when $A_Y$ which is the number of columns having unrepaired faults in all the virtual regions $V_Y$ is equal to or smaller than $C_Y$ which is the number of spare columns available in all the virtual regions $V_Y$, the analyzing device 200 determines that the fault repair is successfully completed. Further, the analyzing device 200 stores, at a fault repair completion time, position information of K bits related with the virtual region, position information of M+N−K bits related with the virtual region, and a fault address according to an allocation result of the spare cell in a fault address storage space which is managed by the physical region and the virtual region in the storage medium 100 corresponding to the virtual region and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region.

For example, $A_0$, $A_1$, $A_2$, and $A_3$ which are the numbers of columns having unrepaired faults in all the virtual regions $V_0$ to $V_3$ are equal to or smaller than $C_0$, $C_1$, $C_2$, and $C_3$ which are the numbers of spare columns available in all the virtual regions $V_0$ to $V_3$, the analyzing device 200 determines that the fault repair is successfully completed. Further, the analyzing device 200 stores position information of K bits related with all the virtual regions $V_0$ to $V_3$, position information of M+N−K bits related with all the virtual regions $V_0$ to $V_3$, and a fault address according to an allocation result of the spare cell in a fault address storage space which is managed by the physical region and the virtual region in the storage medium 100 corresponding to all the virtual regions $V_0$ to $V_3$ and ends the entire processes (S3010).

Further, as the secondarily checking result, when $A_Y$ which is the number of columns having unrepaired faults in all the virtual regions $V_Y$ is not equal to or smaller than $C_Y$ which is the number of spare columns available in all the virtual regions $V_Y$ (or when there is at least one of the number $A_Y$ of columns which are not repaired and have faults which is larger than the number $C_Y$ of spare columns available in all the virtual regions $V_Y$), the analyzing device 200 returns to a process of selecting a next virtual region (or a new virtual region) $V_D$ in which the fault is not repaired among all the sorted virtual regions $V_Y$.

After repeatedly performing the process until $A_Y$ which is the number of columns having unrepaired faults in the selected virtual region $V_D$ becomes equal to or smaller than $C_Y$ which is the number of spare columns available in all the virtual regions $V_Y$, the analyzing device 200 selects a new virtual region $V_D$. Further, the analyzing device 200 repeatedly performs a process of primarily checking whether $A_D$ which is the number of the columns having unrepaired faults in the selected virtual region $V_D$ is equal to or smaller than $C_D$ which is the number of spare columns available in the new virtual region $V_D$ and a process of allocating the spare rows to the selected new virtual region $V_D$ until the number $A_D$ of the columns in the selected new virtual region $V_D$ which are not repaired and have faults becomes equal to or smaller than $C_D$ which is the number of spare columns available in the virtual region $V_D$.

As described above, the analyzing device 200 may perform a spare column allocating process on all the virtual regions $V_Y$ through a spare row allocating process on a column in the selected virtual region $V_D$ which is not repaired and has a fault.

For example, after completely allocating the spare rows to the virtual region $V_0$, for all the virtual regions (for example, $V_0$ to $V_3$), when $A_2$ which is the number of columns having unrepaired faults is larger than $C_2$ which is the number of spare columns available in all the virtual regions, the analyzing device 200 repeatedly performs a process of selecting $V_2$ which is the second virtual region in which the fault is not repaired corresponding to a difference $A_2 - C_2$ (15−8=7)

among difference values ($A_Y$–$C_Y$) for all the sorted virtual regions (for example, $V_0$ to $V_3$) as illustrated in FIG. 3 and allocating the spare row to the selected virtual region $V_2$.

That is, as illustrated in FIGS. 39 to 45, the analyzing device 200 repeatedly performs a process of allocating the spare row to the virtual region $V_2$ so as to satisfy $A_2 <= C_2$ related with the virtual region $V_2$.

Further, after completely allocating the spare row to the virtual region $V_2$, the analyzing device 200 repeatedly performs a process of selecting $V_1$ which is a third virtual region in which the fault is not repaired, corresponding to $A_1$–$C_1$ (8–7=1) among difference values $A_Y$–$C_Y$ for all virtual regions (for example, $V_0$ to $V_3$) illustrated in FIG. 31 and allocating the spare row to the selected virtual region $V_1$.

That is, as illustrated in FIG. 46, the analyzing device 200 performs a process of allocating the spare row to satisfy $A_1 <= C_Y$ related to the virtual region $V_1$ to perform a process of allocating a spare column to all the virtual regions (for example, $V_0$ to $V_3$) and successfully perform the repair and ends the entire spare row allocating process (S3020).

When there is no left (or available) spare row and a value of $A_Y$ of the virtual region $V_Y$ in which $A_Y$–$C_Y$, which is the difference between $A_Y$ which is the number of columns having unrepaired faults in each virtual region and $C_Y$ which is the number of spare columns available in each virtual region, has a maximum value exceeds a value of $C_Y$, the analyzing device 200 determines that the fault repair fails and ends the entire processes.

Figure 47:
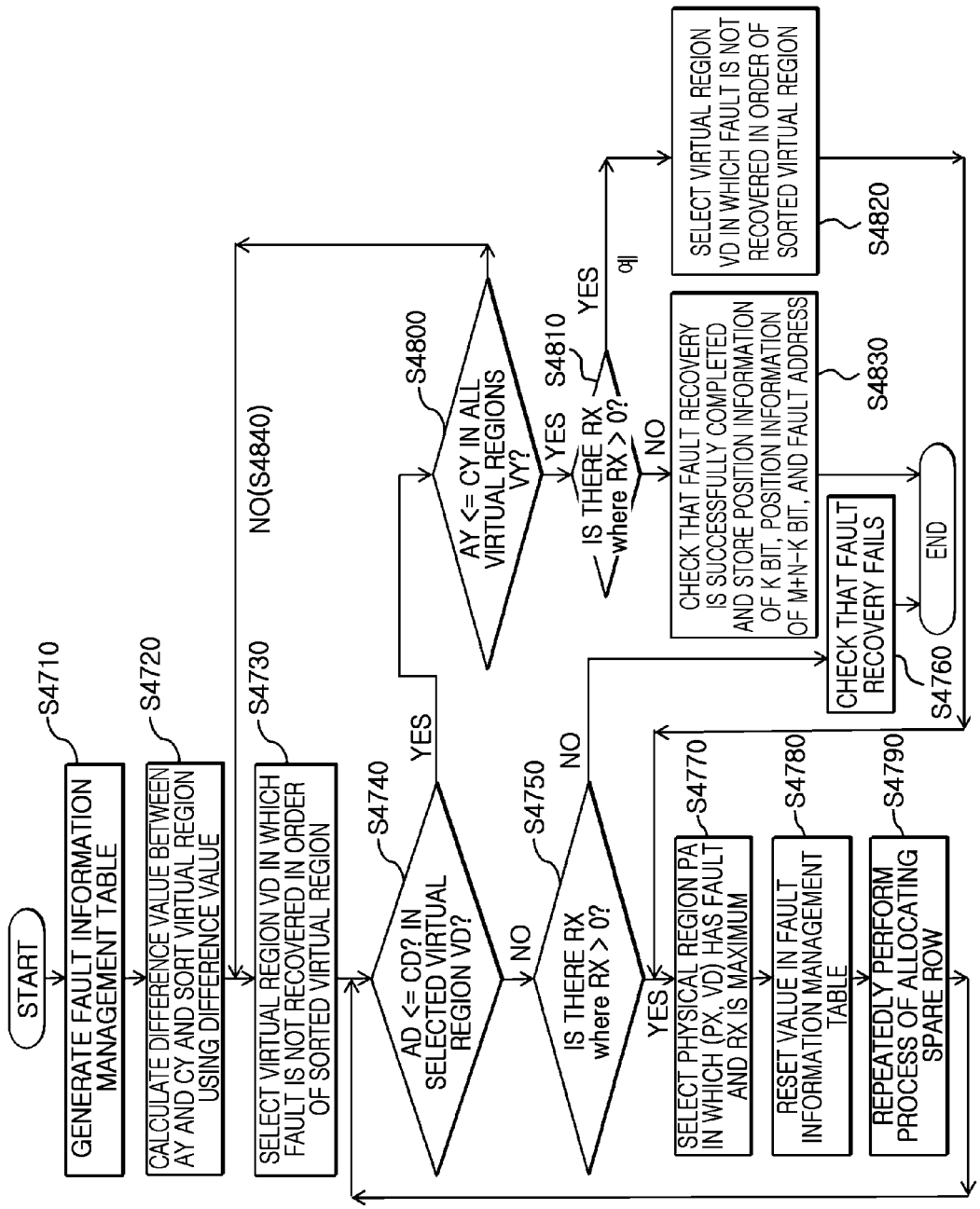
FIG. 47 is a flowchart illustrating a fast row-first based memory management method.

FIG. 47 is a flowchart illustrating a fast row-first based memory management method.

First, the analyzing device 200 generates a fault information management table representing a relationship of ($f_{X,Y}$) which is the number of faults, $R_X$ which is the number of spare rows available in each physical region, $C_Y$ which is the number of spare columns available in each virtual region, and $A_Y$ which is the number of columns having unrepaired faults in each virtual region, for a physical region (or a physical basic region $P_X$) and a virtual region (or a virtual basic region $V_Y$). In this case, X denotes a physical region and Y denotes a virtual region.

Here, the virtual region may be one of all combinations which are configurable by the analyzing device 200 where the analyzing device 200 divides each of the physical basic regions into two physical sub regions having same size and combines the physical sub regions into the virtual basic regions.

Further, the analyzing device 200 checks whether all configurable combinations satisfy a target value which is set in advance by the memory management method. In this case, the target value is a value (or a value to satisfy the information to be stored) which is set in advance corresponding to information to be stored. In the case of a memory system which applies memory repair using a redundant cell, the target value may be a predetermined number (including, for example, a number of spare rows, a number of spare columns, and the like) of available (or available in the memory system) spare cells which are provided in the memory cell. That is, the target value may be a number of same resources which may be available in all physical basic regions which map to a predetermined value corresponding to the information to be stored. Further, in the case of a memory system which avoids a fault memory block, the target value may be a number of same memory blocks which are available in all physical regions of the memory system.

Further, when the number of information to be stored in the combined virtual basic region satisfies a predetermined target value, the analyzing device 200 stores the position information of K bits related with the virtual basic region which satisfies the target value and the position information of M+N–K bits related with the virtual sub region which satisfies the target value in a predetermined (or previously allocated) storage region in the storage medium 100, among the M+N bits. Here, a value of the position information of K bits and a value of the position information of M+N–K bits are configured as vectors and positions of the bits are configured by "0" (or K bits) corresponding to the key value (or a position of K bits) of the virtual basic region and "1" (or M+N–K bits) corresponding to the key value (or a position of M+N–K bits) of the virtual sub region. Here, M represents a number of physical regions, N represents a number of virtual regions, and M, N, and K are natural numbers. Further, the size of K may be a bit rate to approach the information storage table 110 (S4710).

Thereafter, the analyzing device 200 calculates respectively $A_Y$–$C_Y$ which is the difference between $A_Y$ which is the number of the columns having unrepaired faults in each virtual region and $C_Y$ which is the number of spare columns available in each virtual region.

Further, the analyzing device 200 sorts the calculated difference values $A_Y$–$C_Y$. In this case, the sorting method may be a descending order or an ascending order.

That is, the analyzing device 200 sorts the calculated difference value $A_Y$–$C_Y$ and the virtual regions $V_Y$ corresponding to the difference value $A_Y$–$C_Y$ based on the calculated difference value $A_Y$–$C_Y$ (S4720).

Thereafter, the analyzing device 200 selects a virtual region $V_D$ where the fault is not repaired in the sorted order. Here, D may be a value obtained by sorting virtual regions in a descending order using a difference value between the number of columns having faults and the number of spare columns and selecting virtual regions in which the faults are not repaired in the sorted order (S4730).

Thereafter, the analyzing device 200 primarily checks whether $A_D$ which is the number of the columns having unrepaired faults in the selected virtual region $V_D$ is equal to or smaller than $C_D$ which is the number of spare columns available in the virtual region $V_D$ (S4740).

As the primarily checking result, when $A_D$ which is the number of the columns having unrepaired faults in the selected virtual region $V_D$ is larger than $C_D$ which is the number of spare columns available in the virtual region $V_D$, the analyzing device 200 determines that the repair is unable only by the spare column. Therefore, in order to perform the repair using the spare row, the analyzing device 200 determines whether there is $R_X$, which is the number of spare rows available in each physical region and set in advance, which is larger than 0 in the virtual region $V_D$, for all physical regions $P_X$ (S4750).

As the determining result, when there is no $R_X$, which is the number of spare rows available in each physical region and set in advance, which is larger than 0, for all physical regions $P_X$, the analyzing device 200 determines that the fault repair fails and ends the entire processes (S4760).

Further, as the determining result, when there is $R_X$, which is the number of spare rows available in each physical region and set in advance, which is larger than 0, for all physical regions $P_X$, the analyzing device 200 selects one physical region $P_A$ in which ($P_X$, $V_D$) has a fault and $R_X$ which is the number of spare rows available in the physical region is maximum for all physical region $P_X$ of the virtual region $V_D$ (or for the virtual region $V_D$).

Further, the analyzing device 200 checks a row in which $A_D$ which is the number of columns having unrepaired faults in the selected virtual region $V_D$ is reduced as many as possible in $(P_A, V_D)$ corresponding to the selected physical region $P_A$ (S4770).

Thereafter, the analyzing device 200 reduces a value of $(f_{A,D})$ of $(P_A, V_D)$ corresponding to the selected physical region $P_A$ as many as the number of faults which may be repaired by the spare row, which is a first number. Here, $(P_A, V_D)$ represents a cell, which is defined by $P_A$ and $V_D$. $(f_{A,D})$ is the number of the unrepaired faults stored in the cell defined by $P_A$ and $V_D$. Further, the analyzing device 200 reduces $A_D$ which is the number of the columns having unrepaired faults corresponding to the selected physical region $P_A$ as many as the number of columns which may be repaired by the spare row so that the fault repair is not necessary, which is a second number. Further, the analyzing device 200 reduces $R_A$ which is the number of available spare rows as many as the number of used spare rows which is a third number (S4780).

Thereafter, the analyzing device 200 returns to a process (for example, step S4740) of primarily checking whether $A_D$ which is the number of columns having unrepaired faults in the selected virtual region $V_D$ is equal to or smaller than $C_D$ which is the number of spare columns available in the virtual region $V_D$ to repeatedly perform a process of allocating the spare row to the selected virtual region $V_D$ until $A_Y$ which is the number of columns having unrepaired faults in the selected virtual region $V_D$ is equal to or smaller than $C_Y$ which is the number of spare columns available in all the virtual regions $V_Y$ (S4790).

Further, as the primarily checking result, when $A_D$ which is the number of columns having unrepaired faults in the selected virtual region $V_D$ is equal to or smaller than $C_D$ which is the number of spare columns available in the virtual region $V_D$, the analyzing device 200 secondarily checks whether $A_Y$ which is the number of columns having unrepaired faults in all the virtual regions $V_Y$ is equal to or smaller than $C_Y$ which is the number of spare columns available in all the virtual regions $V_Y$ (S4800).

As the secondarily checking result, when $A_Y$ which is the number of columns having unrepaired faults in all the virtual regions $V_Y$ is equal to or smaller than $C_Y$ which is the number of spare columns available in all the virtual regions $V_Y$, the analyzing device 200 secondarily determines whether there is $R_X$, which is the number of spare rows available in each physical region and set in advance, which is larger than 0 in the virtual region $V_D$, for all physical regions $P_X$ (S4810).

As the secondarily determining result, in the virtual region $V_D$, when there is $R_X$, which is the number of spare rows available in each physical region and set in advance, which is larger than 0, for all physical regions $P_X$, the analyzing device 200 selects a next virtual region $V_D$ in which the fault is not repaired in the sorted order. Here, the D may be a value obtained by sorting virtual regions in a descending order using a difference value between the number of columns having faults and the number of spare columns and selecting virtual regions in which the faults are not repaired in the sorted order.

Further, for the newly selected next virtual region, the analyzing device 200 returns to a process (or step S4770) of selecting one physical region $P_A$ in which $(P_X, V_D)$ has a fault and the number of spare rows available in the corresponding physical region is maximum for all physical region $P_X$ of the next virtual region (or the virtual region $V_D$) and checking a row in which $A_Q$ which is the number of columns having unrepaired faults in the selected virtual region $V_Q$ is reduced as many as possible in $(P_A, V_Q)$ corresponding to the selected physical region $P_A$ (S4820).

Further, as the secondarily determining result, in the virtual region $V_D$, when there is no $R_X$, which is the number of spare rows available in each physical region and set in advance, which is larger than 0, for all physical regions $P_X$, the analyzing device 200 determines that the fault repair is successfully completed, stores, at a fault repair completion time, position information of K bits related with the virtual region, position information of M+N−K bits related with the virtual region, and a fault address according to an allocation result of the spare cell in a fault address storage space which is managed by the physical region and the virtual region in the storage medium 100 corresponding to the virtual region and ends the entire processes. Here, a value of the position information of K bits and a value of the position information of M+N−K bits are configured as vectors and positions of the bits are configured by "0" (or K bits) corresponding to the key value (or a position of K bits) of the virtual basic region and "1" (or M+N−K bits) corresponding to the key value (or a position of M+N−K bits) of the virtual sub region (S4830).

Further, as the secondarily checking result, when $A_Y$ which is the number of columns having unrepaired faults in all the virtual regions $V_Y$ is not equal to or smaller than $C_Y$ which is the number of spare columns available in all the virtual regions $V_Y$ (or when there is at least one of $A_Y$, which is the number of columns having unrepaired faults, which is larger than $C_Y$ which is the number of spare columns available in all the virtual regions $V_Y$), the analyzing device 200 returns to a process of selecting a virtual region $V_D$ in which the fault is not repaired among all the sorted virtual regions $V_Y$.

Further, after repeatedly performing the process until $A_Y$ which is the number of columns having unrepaired faults in the selected virtual region $V_D$ becomes equal to or smaller than $C_Y$ which is the number of spare columns available in all the virtual regions $V_Y$, the analyzing device 200 selects a new virtual region $V_D$. Further, the analyzing device 200 repeatedly performs a process of primarily checking whether $A_D$ which is the number of the columns having unrepaired faults in the selected virtual region $V_D$ is equal to or smaller than $C_D$ which is the number of spare columns available in the new virtual region $V_D$ and a process of allocating the spare rows to the selected new virtual region $V_D$ until $A_Y$ which is the number of the columns having unrepaired faults in the selected new virtual region $V_D$ becomes equal to or smaller than $C_Y$ which is the number of spare columns available in all the virtual regions $V_Y$.

As described above, the analyzing device 200 may perform a spare column allocating process on all the virtual regions $V_Y$ through a spare row allocating process on a column in the selected virtual region $V_D$ which is not repaired and has a fault (S4840).

When there is no left (or available) spare row and a value of $A_Y$ of the virtual region $V_Y$, in which $A_Y-C_Y$ has a maximum value, exceeds a value of $C_Y$, the analyzing device 200 determines that the fault repair fails and ends the entire processes. Here, $A_Y-C_Y$ is the difference between $A_Y$, which is the number of columns having unrepaired faults in each virtual region, and $C_Y$, which is the number of spare columns available in each virtual region, According to the present solution, as described above, restricted spare cells are optimally distributed (or allocated) into a physical region and a virtual region in a system for repairing a fault of a memory, thereby increasing a yield of a memory chip.

Further, as described above, sub arrays serve as physical regions in a unit region and virtual regions obtained by recombining the sub arrays is optimally distributed in separate spare cells to maximize fault repair, thereby increasing a possibility of utilizing extra spare cells according to a purpose of the system.

Further, as described above, it is possible to provide allocation of spare cells which satisfy simultaneously not only a designed target value of a virtual region but also a designed target value of a physical region and store a fault address in a fault address storage space which is managed by K bit position information at an allocation time, M+N−K bit position information, and a physical region and a virtual region in a corresponding storage medium according to an allocating result of the spare cell, thereby providing an optimal efficiency using a minimum number of spare cells for the physical region and the virtual region.

Further, as described above, after repeatedly performing a repair on a virtual region selected by a fast column-first algorithm and a fast row-first algorithm using a column or a row, a repair is performed on a next virtual region, thereby shortening an entire repair time.

Changes or modifications of the above description may be made by those skilled in the art without departing from the spirit and scope of the present invention. Therefore, the exemplary embodiments of the present invention are provided for illustrative purposes only but not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

The present solution optimally distributes (or allocates) restricted spare cells into a physical region and a virtual region in a system for repairing a fault of a memory, to increase a yield of a memory chip and broadly used in an information storage device of a memory field, and the like.

What is claimed is:

1. A memory management method, comprising:
   preferentially repairing a fault in a virtual region, by means of an analyzing device;
   wherein the virtual region is obtained by recombining a physical region;
   wherein different spare cells are used to repair the fault in the virtual region and the physical region;
   wherein the preferentially repairing a fault in the virtual region includes:
      generating a fault information management table related with the physical region and the virtual region, by means of the analyzing device;
      selecting a virtual region $V_Q$ in which a difference between $A_Y$, which is the number of columns having unrepaired fault in each of the virtual regions included in the fault information management table, and $C_Y$, which is the number of spare columns available in each of the virtual regions included in the fault information management table, has a maximum value, by means of the analyzing device;
      checking whether $A_Q$, which is the number of columns having unrepaired faults in the selected virtual region $V_Q$, is equal to or smaller than the $C_Q$, which is the number of available spare columns in the selected virtual region $V_Q$, by means of the analyzing device; and
      determining that the repair is unable only by the spare column when the $A_Q$ is larger than the $C_Q$ in the selected virtual region $V_Q$, as the checking result, and in order to perform the repair using the spare row, determining whether there is $R_X$ which is larger than 0 in the virtual region $V_Q$, by means of the analyzing device, $R_X$ being the number of spare rows available in each of the physical regions and being set in advance for all of the physical regions $P_X$; and
   wherein Q is a value of a virtual region where a difference between the number of columns having fault and the number of spare columns has a maximum value.

2. The method of claim 1, wherein the fault information management table represents a relationship of (fx,y), Rx, Cy and Ay for the physical region $P_x$ and the virtual region Vy, (fx,y) being the number of the unrepaired faults stored in the cell defined by the physical region $P_x$ and the virtual region Vy, Rx being the number of spare columns in each of the virtual regions and Ay being the number of columns having unrepaired faults in each of the virtual regions, and X denotes a physical region and Y denotes a virtual region.

3. The method of claim 1, further comprising:
   when $A_Q$, which is the number of columns having unrepaired faults in the selected virtual region $V_Q$, is equal to or smaller than $C_Q$, which is the number of available spare columns in the selected virtual region $V_Q$, as the checking result, determining that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in a non-transitory storage medium corresponding to the virtual region, and ending the entire processes, by means of the analyzing device,
   wherein a value of the position information of K bits and a value of the position information of M+N−K bits are configured as vectors and positions of the bits are configured by "0" corresponding to a key value of the virtual basic region and "1" corresponding to a key value of the virtual sub region, and M, N, and K are natural numbers and K is equal to or smaller than M+N.

4. The method of claim 1, further comprising:
   when there is no $R_x$, which is the number of spare rows available in each of the physical regions which is larger than 0 which is set in advance, for all of the physical regions Px, as the determining result, determining that the fault repair fails and ending the entire processes, by means of the analyzing device.

5. The method of claim 1, further comprising:
   when there is no available spare row and a value of Ay of the virtual region $V_Q$ is larger than a value of Cy of the virtual region $V_Q$, determining that the fault repair fails and ending the entire processes, by means of the analyzing device, Ay being the number of columns having unrepaired fault in each of the virtual regions, Cy being the number of spare columns available in each of the virtual regions and $V_Q$ being the virtual region in which the difference between Ay and Cy having the maximum value.

6. The method of claim 1, further comprising: when there is Rx, which is the number of spare rows available in each of the physical regions and set in advance, which is larger than 0, for all of the physical regions Px of the virtual region $V_Q$, as the determining result, selecting one physical region PA in which (Px, VQ) has a fault and Rx, which is the number of spare rows available in the physical region, has maximum value, by means of the analyzing device, PA being one of the physical regions $P_x$ and $(P_A, V_Q)$ representing cells, which are defined by Px and $V_Q$, of the fault information management table;
  checking a row in which $A_Q$, which is the number of columns having unrepaired faults in the selected virtual region $V_Q$, is reduced at the most in (PA, $V_Q$) corresponding to the selected physical region PA, by means of the analyzing device, (PA, VQ) representing a cell, which is defined by PA and $V_Q$, of the fault information management table;
  reducing a value of (fA,$_Q$) of (PA, $V_Q$) corresponding to the selected physical region PA as many as the number of faults which are repaired by the spare row, by means of the analyzing device, $(P_A, V_Q)$ representing a cell, which is defined by PA and $V_Q$, of the fault information management table and (fA,Q) being the number of the unrepaired faults stored in the cell defined by PA and $V_Q$;
  reducing $A_Q$, which is the number of columns corresponding to the selected physical region PA which are not repaired and have faults, as many as the number of columns which are repaired by the spare row so that the fault repair is not necessary, by means of the analyzing device;
  reducing $R_A$, which is the number of available spare rows, as many as the number of used spare rows, by means of the analyzing device; and
  returning to a process of selecting the virtual region $V_Q$ in which a difference between Ay, which is the number of columns having unrepaired fault in each of the virtual regions included in the fault information management table, and Cy, which is the number of spare columns available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of available spare columns in the selected virtual region $V_Q$, by means of the analyzing device.

7. A memory management method, comprising:
preferentially repairing a fault in a virtual region, by means of an analyzing device,
wherein the preferentially repairing a fault in the virtual region includes:
generating the fault information management table related with the physical region and the virtual region, by means of the analyzing device;
calculating a difference value Ay-Cy, which is difference between Ay, which is the number of columns having unrepaired fault in each of the virtual regions included in the fault information management table, and Cy, which is the number of spare columns available in each of the virtual regions included in the fault information management table, by means of the analyzing device;
sorting the calculated difference value Ay-Cy and the virtual regions Vy corresponding to the difference value Ay-Cy based on the calculated difference value Ay-Cy, by means of the analyzing device;
selecting a virtual region $V_D$ in which the fault is not repaired, in the sorted order, by means of the analyzing device; primarily checking whether $A_D$, which is the number of columns having unrepaired fault in the selected virtual region VD, is equal to or smaller than CD, which is the number of spare columns available in the virtual region VD, by means of the analyzing device; and when the $A_D$ is larger than the CD, as the primarily checking result, determining that the repair is unable only by the spare column and in order to perform the repair using the spare row, determining whether there is $R_x$ which is larger than 0 in the virtual region $V_D$, for all physical regions Px, by means of the analyzing device, $R_x$ being the number of spare rows available in each of the physical regions and being set in advance for all of the physical regions $P_x$,
wherein D is a value obtained by sorting virtual regions in a descending order using a difference value between the number of columns having faults and the number of spare columns and selecting virtual regions in which the faults are not repaired in the sorted order.

8. The method of claim 7, wherein the fault information management table represents a relationship of (fx,y) which is the number of faults, $R_x$ which is the number of spare rows available in each of the physical regions, Cy which is the number of available spare columns in each of the virtual regions, and Ay which is the number of columns in each of the virtual regions having unrepaired faults, for the physical region Px and the virtual region Vy, and X denotes a physical region and Y denotes a virtual region.

9. The method of claim 7, further comprising:
when there is $R_x$, which is the number of spare rows available in each of the physical regions and set in advance, which is larger than 0, for all physical regions Px of the virtual region $V_D$, as the determining result, selecting one physical region PA in which (Px, VD) has a fault and Rx, which is the number of spare rows available in the physical region, has maximum value, by means of the analyzing device, PA being one of the physical regions $P_x$ and $(P_x, V_D)$ representing cells, which are defined by Px and VD, of the fault information management table;
checking a row in which AD, which is the number of columns having unrepaired faults in the selected virtual region VD is reduced at the most in (PA, VD) corresponding to the selected physical region PA, by means of the analyzing device, (PA, VD) representing a cell, which is defined by PA and $V_Q$, of the fault information management table;
reducing a value of (fA,D) of (PA, VD) corresponding to the selected physical region PA as many as the number of faults which are repaired by the spare row, by means of the analyzing device, $(P_A, V_D)$ representing a cell, which is defined by PA and $V_D$, of the fault information management table and (fA,D) being the
number of the unrepaired faults stored in the cell defined by PA and VD;
reducing AD, which is the number of columns corresponding to the selected physical region PA which are not repaired and have faults, as many as the number of columns which are repaired by the spare row so that the fault repair is not necessary, by means of the analyzing device;
reducing RA, which is the number of available spare rows, as many as the number of used spare rows, by means of the analyzing device; and
returning to a process of primarily checking whether AD which is the number of columns having unrepaired fault in the selected virtual region VD, is equal to or smaller than CD, which is the number of spare columns available in the virtual region $V_D$ to repeatedly perform a process of allocating the spare row to the selected virtual region VD until $A_D$, which is the number of columns having unrepaired faults in the selected virtual region VD, is equal to or smaller than CD, which is the number of spare columns available in the selected virtual region VD, by means of the analyzing device.

10. The method of claim 7, further comprising:
when there is no $R_x$, which is the number of spare rows available in each of the physical regions and set in advance, which is larger than 0, for all physical regions Px, as the determining result, determining that the fault repair fails and ending the entire processes, by means of the analyzing device.

11. The method of claim 7, further comprising:
when $A_D$, which is the number of columns having unrepaired fault in the selected virtual region VD, is equal to or smaller than CD, which is the number of spare columns available in the virtual region $V_D$, as the primarily checking result, secondarily checking whether Ay, which is the number of columns having unrepaired fault in all of the virtual regions Vy, is equal to or smaller than Cy, which is the number of spare columns available in all of the virtual regions Vy, by means of the analyzing device;
when Ay, which is the number of columns having unrepaired fault in all of the virtual regions Vy, is equal to or smaller than Cy, which is the number of spare columns available in all of the virtual regions Vy, as the secondarily checking result, confirming that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in a non-transitory storage medium corresponding to the virtual region, and ending the entire processes, by means of the analyzing device; and
when Ay, which is the number of columns having unrepaired fault in all of the virtual regions Vy, is larger than Cy, which is the number of spare columns available in all of the virtual regions Vy, as the secondarily checking result, selecting a next virtual region having unrepaired fault among the sorted virtual regions Vy, by means of the analyzing device,
wherein a value of the position information of K bits and a value of the position information of M+N−K bits are configured as vectors and positions of the bits are configured by "0" corresponding to a key value of the virtual basic region and "1" corresponding to a key value of the virtual sub region, and M, N, and K are natural numbers and K is equal to or smaller than M+N.

12. The method of claim 7, further comprising:
when there is no available spare row and a value of Ay of the virtual region $V_Q$ is larger than a value of Cy of the virtual region $V_Q$, determining that the fault repair fails and ending the entire processes, by means of the analyzing device, Ay being the number of columns having unrepaired fault in each of the virtual regions, Cy being the number of spare columns available in each of the virtual regions and $V_Q$ being the virtual region in which the difference between Ay and Cy having the maximum value.

13. A memory management system, comprising:
a non-transitory storage medium which stores a fault information management table related with a physical region and a virtual region; and
an analyzing device which preferentially repairs a fault in the virtual region;

wherein the analyzing device generates a fault information management table related with a physical region and a virtual region, selects a virtual region $V_Q$ in which a difference between Ay, which is number of columns having unrepaired fault in each of the virtual regions included in the fault information management table, and Cy, which is number of spare columns available in each of the virtual regions included in the fault information management table, has a maximum value, checks whether $A_Q$, which is number of columns having unrepaired faults in the selected virtual region $V_Q$, is equal to or smaller than $C_Q$, which is number of available spare columns in the selected virtual region $V_Q$, and determines whether there is Rx, which is number of spare rows available in each of the physical regions and set in advance for all of the physical regions Px, which is larger than 0 in the virtual region $V_Q$, when $A_Q$, which is number of columns having unrepaired fault in the selected virtual region $V_Q$, is larger than $C_Q$, which is number of available spare columns in the virtual region $V_Q$, as the checking result, and
wherein Q is a value of a virtual region where a difference between the number of columns having fault and the number of spare columns has a maximum value.

14. The system of claim 13, wherein the fault information management table represents a relationship of (fx,y), Rx, Cy and Ay for the physical region $P_x$ and the virtual region Vy, (fx,y) being the number of the unrepaired faults stored in the cell defined by the physical region $P_x$ and the virtual region Vy, Rx being the number of spare columns in each of the virtual regions and Ay being the number of columns having unrepaired faults in each of the virtual regions, and
X denotes a physical region and Y denotes a virtual region.

15. The system of claim 13,
wherein, when $A_Q$, which is the number of columns having unrepaired faults in the selected virtual region $V_Q$, is equal to or smaller than $C_Q$, which is the number of available spare columns in the selected virtual region $V_Q$, as the checking result, the analyzing device determines that the fault repair is successfully completed, stores position information of K bits related with the virtual region, position information of M+N−K bits related with the virtual region, and a fault address according to an allocation result of the spare cell at a fault repair completion time in a fault address storage space which is managed by the physical region and the virtual region in the non-transitory storage medium corresponding to the virtual region, and ends the entire processes,
a value of the position information of K bits and a value of the position information of M+N−K bits are configured as vectors and positions of the bits are configured by "0" corresponding to a key value of the virtual basic region and "1" corresponding to a key value of the virtual sub region, and
M, N, and K are natural numbers and K is equal to or smaller than M+N.

16. The system of claim 13, wherein, when there is no $R_x$, which is the number of spare rows available in each physical region which is larger than 0 which is set in advance, for all physical regions Px, as the determining result, the analyzing device determines that the fault repair fails and ends the entire processes.

17. The system of claim 13, wherein, when there is no available spare row and a value of Ay of the virtual region $V_Q$ is larger than a value of Cy of the virtual region $V_Q$, the analyzing device determines that the fault repair fails and ends the entire processes, Ay being the number of columns having unrepaired fault in each of the virtual regions, Cy being the number of spare columns available in each of the virtual regions and $V_Q$ being the virtual region in which the difference between Ay and Cy having the maximum value.

18. The system of claim 13, wherein, when there is $R_x$, which is the number of spare rows available in each of the physical regions and set in advance, which is larger than 0, for all of the physical regions Px of the virtual region $V_Q$, as the determining result, the analyzing device:
  selects one physical region PA in which (Px, VQ) has a fault and $R_x$, which is the number of spare rows available in the physical region, has maximum value, PA being one of the physical regions $P_x$ and $(P_A, V_Q)$ representing cells, which are defined by $P_x$ and $V_Q$, of the fault information management table;
  checks a row in which $A_Q$, which is the number of columns having unrepaired faults in the selected virtual region $V_Q$, is reduced at the most in (PA, $V_Q$) corresponding to the selected physical region PA, (PA, VQ) representing a cell, which is defined by PA and $V_Q$, of the fault information management table;
  reduces a value of $(fA_{,Q})$ of (PA, $V_Q$) corresponding to the selected physical region PA as many as the number of faults which are repaired by the spare row, (PA, $V_Q$) representing a cell, which is defined by PA and $V_Q$, of the fault information management table and $(fA_{,Q})$ being the number of the unrepaired faults stored in the cell defined by PA and VQ;
  reduces $A_Q$, which is the number of columns corresponding to the selected physical region PA which are not repaired and have faults, as many as the number of columns which are repaired by the spare row so that the fault repair is not necessary;
  reduces RA, which is the number of available spare rows, as many as the number of used spare rows; and
  returns to a process of selecting the virtual region $V_Q$ in which a difference between Ay, which is the number of columns having unrepaired fault in each of the virtual regions included in the fault information management table, and Cy, which is the number of spare columns available in each of the virtual regions included in the fault information management table, has a maximum value to repeatedly perform a process of allocating a spare row until $A_Q$, which is the number of columns having unrepaired faults in the selected virtual region $V_Q$, is equal to or smaller than $C_Q$, which is the number of available spare columns in the selected virtual region $V_Q$.

19. A memory management method, comprising:
  preferentially repairing a fault in a physical region, by means of an analyzing device;
  wherein the preferentially repairing a fault in the physical region includes:
    generating a fault information management table related with a physical region and a virtual region, by means of the analyzing device;
    selecting a virtual region $V_Q$ in which a difference between Ay, which is number of columns having unrepaired fault in each of the virtual regions included in the fault information management table, and Cy, which is number of spare columns available in each of the virtual regions included in the fault information management table, has a maximum value, by means of the analyzing device;
    determining whether there is Rx, which is number of spare rows available in each of the physical regions and set in advance, which is larger than 0, for all of the physical regions Px, by means of the analyzing device; and
    when there is no Rx, which is the number of spare rows available in each of the physical regions which is larger than 0 which is set in advance, for all of the physical regions Px, as the determining result, checking whether Ay, which is number of columns having unrepaired faults in all of the virtual regions, is equal to or smaller than the Cy, which is number of available spare columns in the virtual region, by means of the analyzing device; and
  wherein Q is a value of a virtual region where a difference between the number of columns having fault and the number of spare columns has a maximum value.

20. The method of claim 19, further comprising:
  when Ay, which is the number of columns having unrepaired fault in all of the virtual regions, is equal to or smaller than Cy, which is the number of spare columns available in all of the virtual regions, as the checking result, confirming that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in a non-transitory storage medium corresponding to the virtual region, and ending the entire processes, by means of the analyzing device,
  wherein a value of the position information of K bits and a value of the position information of M+N−K bits are configured as vectors and positions of the bits are configured by "0" corresponding to a key value of the virtual basic region and "1" corresponding to a key value of the virtual sub region and M, N, and K are natural numbers and K is equal to or smaller than M+N.

21. The method of claim 19, further comprising:
  when Ay, which is the number of columns having unrepaired fault in all the virtual regions, is larger than Cy, which is the number of available spare columns in the virtual region, as the checking result, determining that the repair is unable only by using the spare rows available in the virtual region Vy and the fault repair fails and ending the entire processes, by means of the analyzing device.

22. The method of claim 19, further comprising:
  when there is $R_x$, which is the number of spare rows available in each of the physical regions and set in advance, which is larger than 0, for all of the physical regions Px of the virtual region $V_Q$, as the determining result, selecting one physical region PA in which (Px, VQ) has a fault and Rx, which is the number of spare rows available in the physical region, has maximum value, by means of the analyzing device, PA being one of the physical regions Px and $(P_A, V_Q)$ representing cells, which are defined by PA and $V_Q$, of the fault information management table;
  checking a row in which $A_Q$, which is the number of columns having unrepaired faults in the selected virtual region $V_Q$, is reduced at the most in (PA, $V_Q$) corresponding to the selected physical region PA, by means of the analyzing device, (PA, VQ) representing a cell, which is defined by PA and $V_Q$, of the fault information management table;

reducing a value of (fA,$_Q$) of (PA, V$_Q$) corresponding to the selected physical region PA as many as the number of faults which are repaired by the spare row, by means of the analyzing device, (P$_A$, V$_Q$) representing a cell, which is defined by PA and V$_Q$, of the fault information management table and (fA,Q) being the number of the unrepaired faults stored in the cell defined by PA and V$_Q$;

reducing A$_Q$, which is the number of columns corresponding to the selected physical region PA which are not repaired and have faults, as many as the number of columns which are repaired by the spare row so that the fault repair is not necessary, by means of the analyzing device;

reducing R$_A$, which is the number of available spare rows, as many as the number of used spare rows, by means of the analyzing device; and returning to a process of selecting the virtual region V$_Q$ in which a difference between Ay, which is the number of columns having unrepaired fault in each of the virtual regions included in the fault information management table, and Cy, which is the number of spare columns available in each of the virtual regions included in the fault information management table, has a maximum value to repeatedly perform a process of allocating a spare row until A$_Q$, which is the number of columns having unrepaired faults in the selected virtual region V$_Q$, is equal to or smaller than C$_Q$, which is the number of available spare columns in the selected virtual region V$_Q$, by means of the analyzing device.

23. A memory management method, comprising:

preferentially repairing a fault in a physical region, by means of an analyzing device;

wherein the preferentially repairing a fault in the physical region includes:

generating the fault information management table related with the physical region and the virtual region, by means of the analyzing device;

calculating a difference value Ay–Cy, which is difference between Ay, which is the number of columns having unrepaired fault in each of the virtual regions included in the fault information management table, and Cy, which is the number of spare columns available in each of the virtual regions included in the fault information management table, by means of the analyzing device;

sorting the calculated difference value Ay–Cy and the virtual regions Vy corresponding to the difference value Ay–Cy based on the calculated difference value Ay-Cy, by means of the analyzing device;

selecting a virtual region V$_D$ in which the fault is not repaired, in the sorted order, by means of the analyzing device;

primarily checking whether A$_D$, which is the number of columns having unrepaired fault in the selected virtual region VD, is equal to or smaller than CD, which is the number of spare columns available in the virtual region VD, by means of the analyzing device;

when the A$_D$ is larger than the CD, as the primarily checking result, determining that the repair is unable only by the spare column and in order to perform the repair using the spare row, primarily determining whether there is R$_x$ which is larger than 0 in the virtual region V$_D$, for all physical regions Px, by means of the analyzing device, Rx being the number of spare rows available in each of the physical regions and being set in advance for all of the physical regions P$_x$;

when there is R$_x$, which is the number of spare rows available in each of the physical regions and set in advance, which is larger than 0, for all physical regions Px of the virtual region V$_D$, as the primarily determining result, selecting one physical region PA in which (Px, VD) has a fault and Rx, which is the number of spare rows available in the physical region, has maximum value, by means of the analyzing device, PA being one of the physical regions P$_x$ and (P$_x$, V$_D$) representing cells, which are defined by Px and VD, of the fault information management table; and checking a row in which A$_D$, which is the number of columns having unrepaired faults in the selected virtual region VD is reduced at the most in (PA, VD) corresponding to the selected physical region PA, by means of the analyzing device, (PA, VD) representing a cell, which is defined by PA and V$_Q$, of the fault information management table, wherein D is a value obtained by sorting virtual regions in a descending order using a difference value between the number of columns having faults and the number of spare columns and selecting virtual regions in which the faults are not repaired in the sorted order.

24. The method of claim 23, wherein the fault information management table represents a relationship of (fx,y) which is the number of faults, Rx which is the number of spare rows available in each of the physical regions, Cy which is the number of available spare columns in each of the virtual regions, and Ay which is the number of columns in each of the virtual regions having unrepaired faults, for the physical region P$_x$ and the virtual region Vy, and X denotes a physical region and Y denotes a virtual region.

25. The method of claim 23, further comprising:

reducing a value of (fA,D) of (PA, VD) corresponding to the selected physical region PA as many as the number of faults which are repaired by the spare row, by means of the analyzing device, (P$_A$, V$_D$) representing a cell, which is defined by PA and V$_D$, of the fault information management table and (fA,D) being the number of the unrepaired faults stored in the cell defined by PA and V$_D$;

reducing AD, which is the number of columns corresponding to the selected physical region PA which are not repaired and have faults, as many as the number of columns which are repaired by the spare row so that the fault repair is not necessary, by means of the analyzing device;

reducing RA, which is the number of available spare rows, as many as the number of used spare rows, by means of the analyzing device; and returning to a process of primarily checking whether AD which is the number of columns having unrepaired fault in the selected virtual region VD, is equal to or smaller than CD, which is the number of spare columns available in the virtual region VD to repeatedly perform a process of allocating the spare row to the selected virtual region VD until A$_D$, which is the number of columns having unrepaired faults in the selected virtual region VD, is equal to or smaller than CD, which is the number of spare columns available in the selected virtual region VD, by means of the analyzing device.

26. The method of claim 23, further comprising:
when there is no $R_x$, which is the number of spare rows available in each of the physical regions and set in advance, which is larger than 0 which is set in advance, for all physical regions $P_x$, as the primarily determining result, determining that the fault repair fails and ending the entire processes, by means of the analyzing device.

27. The method of claim 23, further comprising:
when $A_D$, which is the number of columns having unrepaired fault in the selected virtual region VD, is equal to or smaller than CD, which is the number of spare columns available in the virtual region $V_D$, as the primarily checking result, secondarily checking whether Ay, which is the number of columns having unrepaired fault in all of the virtual regions Vy, is equal to or smaller than Cy, which is the number of spare columns available in all of the virtual regions Vy, by means of the analyzing device;

when Ay, which is the number of columns having unrepaired fault in all of the virtual regions Vy, is equal to or smaller than Cy, which is the number of spare columns available in all of the virtual regions Vy, as the secondarily checking result, secondarily determining whether there is $R_x$, which is the number of spare rows available in each of the physical regions and set in advance, which is larger than 0, for all physical regions $P_x$, by means of the analyzing device;

when there is $R_x$, which is the number of spare rows available in each of the physical regions and set in advance, which is larger than 0, for all of the physical regions Px, as the secondarily determining result, selecting a next virtual region $V_D$ in which the fault is not repaired in the sorted order, by means of the analyzing device;

when there is no $R_x$, which is the number of spare rows available in each of the physical regions and set in advance, which is larger than 0, for all physical regions Px, as the secondarily determining result, determining that the fault repair is successfully completed, storing position information of K bits related with the virtual region, position information of M+N−K bits related with the virtual region, and a fault address according to an allocation result of the spare cell at a fault repair completion time in a fault address storage space which is managed by the physical region and the virtual region in a non-statutory storage medium corresponding to the virtual region, and ending the entire processes, by means of the analyzing device; and when Ay, which is the number of columns having unrepaired fault in all of the virtual regions Vy, is larger than Cy, which is the number of spare columns available in all of the virtual regions Vy, as the secondarily checking result, returning to the process of selecting a virtual region in which the fault is not repaired among all the sorted virtual regions Vy, by means of the analyzing device.

28. The method of claim 23, further comprising:
when there is no available spare row and a value of Ay of the virtual region $V_Q$ is larger than a value of Cy of the virtual region $V_Q$, determining that the fault repair fails and ending the entire processes, by means of the analyzing device, Ay being the number of columns having unrepaired fault in each of the virtual regions, Cy being the number of spare columns available in each of the virtual regions and $V_Q$ being the virtual region in which the difference between Ay and Cy having the maximum value.

* * * * *